United States Patent [19]
Fuller et al.

[11] 3,872,455
[45] Mar. 18, 1975

[54] PHYSIOLOGICAL MEASUREMENT DISPLAY SYSTEM

[75] Inventors: Charles H. Fuller, Carson; Carl E. Herring, Huntington Beach, both of Calif.

[73] Assignee: Monitron Industries, Inc., Huntington Beach, Calif.

[22] Filed: Nov. 13, 1972

[21] Appl. No.: 306,253

Related U.S. Application Data

[63] Continuation-in-part of Ser. Nos. 199,675, Nov. 17, 1971, and Ser. No. 200,368, Nov. 18, 1971, and Ser. No. 199,847, Nov. 18, 1971, and Ser. No. 199,979, Nov. 18, 1971.

[52] U.S. Cl. ...... 340/189 M, 340/177 VA, 340/178, 340/206, 340/207, 128/2.1 A, 343/842
[51] Int. Cl. ............................................. G08c 19/26
[58] Field of Search ............. 340/347 AD, 206, 207; 128/2.1 A; 73/362 AR; 325/113; 324/78 D; 343/842

[56] References Cited
UNITED STATES PATENTS

| | | | |
|---|---|---|---|
| 2,394,787 | 2/1946 | Kreager | 343/842 |
| 2,990,541 | 6/1961 | Gill | 340/206 |
| 3,453,546 | 7/1969 | Fryer | 325/118 |
| 3,495,264 | 2/1970 | Spears | 343/842 |
| 3,534,728 | 10/1970 | Barrows | 73/362 AR |
| 3,572,316 | 3/1971 | Vogelman et al. | 340/207 R |
| 3,656,132 | 4/1972 | Brumbelow | 340/195 |

Primary Examiner—Thomas B. Habecker
Attorney, Agent, or Firm—Jones, Tullar & Cooper

[57] ABSTRACT

A system for receiving and displaying data generated by a transmitter having an output pulse rate corresponding to a measured parameter is disclosed. A portable receiver is provided which includes means for detecting weak signals having a repetitive burst rate, means for locking onto the burst rate and producing a corresponding train of pulses, means for counting the number of pulses received during a predetermined time period and means for displaying a number related to the received pulse rate to provide a digital representation of the monitored parameter. The system further includes means for compensating for non-linearities in the pulse rate of the received signals due to known non-linearities in the signal generator, and includes means for disabling the display in the event of an incomplete measurement, whereby accuracy of the display is assured. The receiver is particularly useful in combination with a physiological sensor-transmitter which produces signals having a pulse rate related to a measured parameter, such as temperature.

42 Claims, 23 Drawing Figures

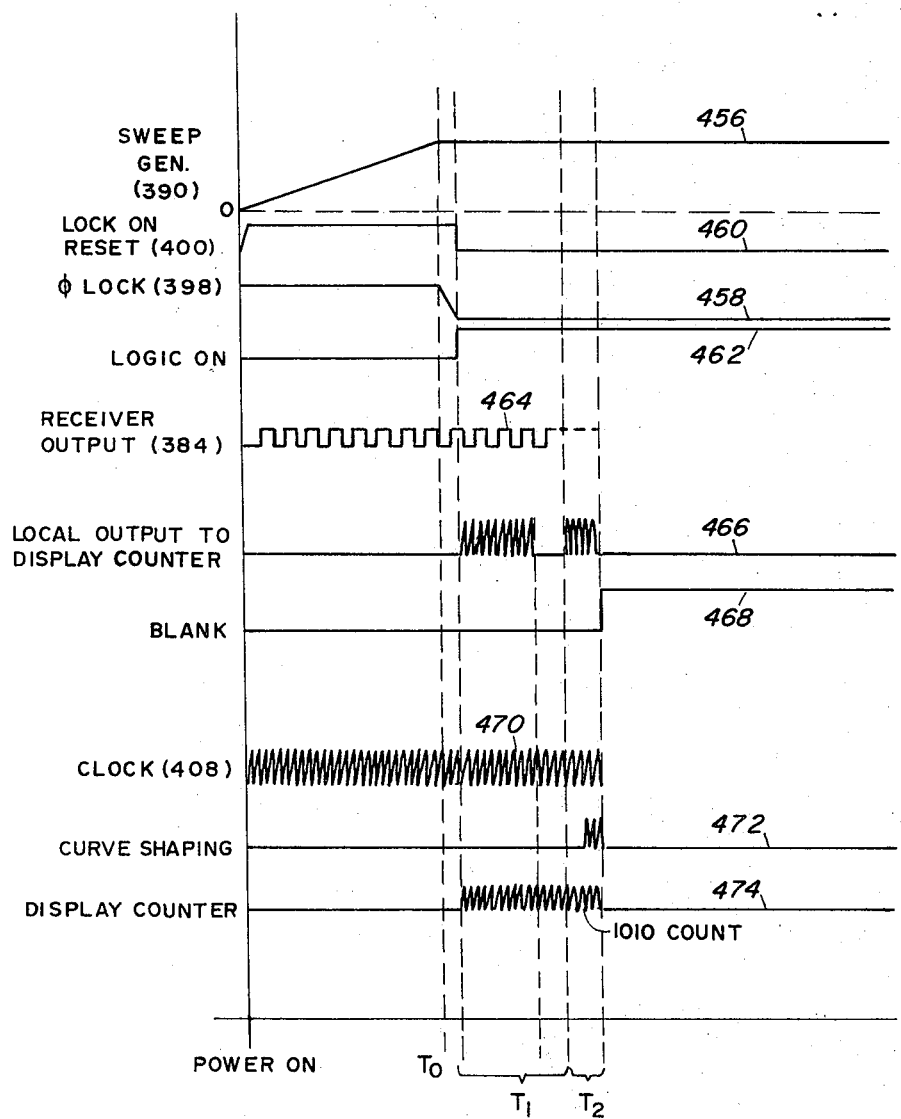

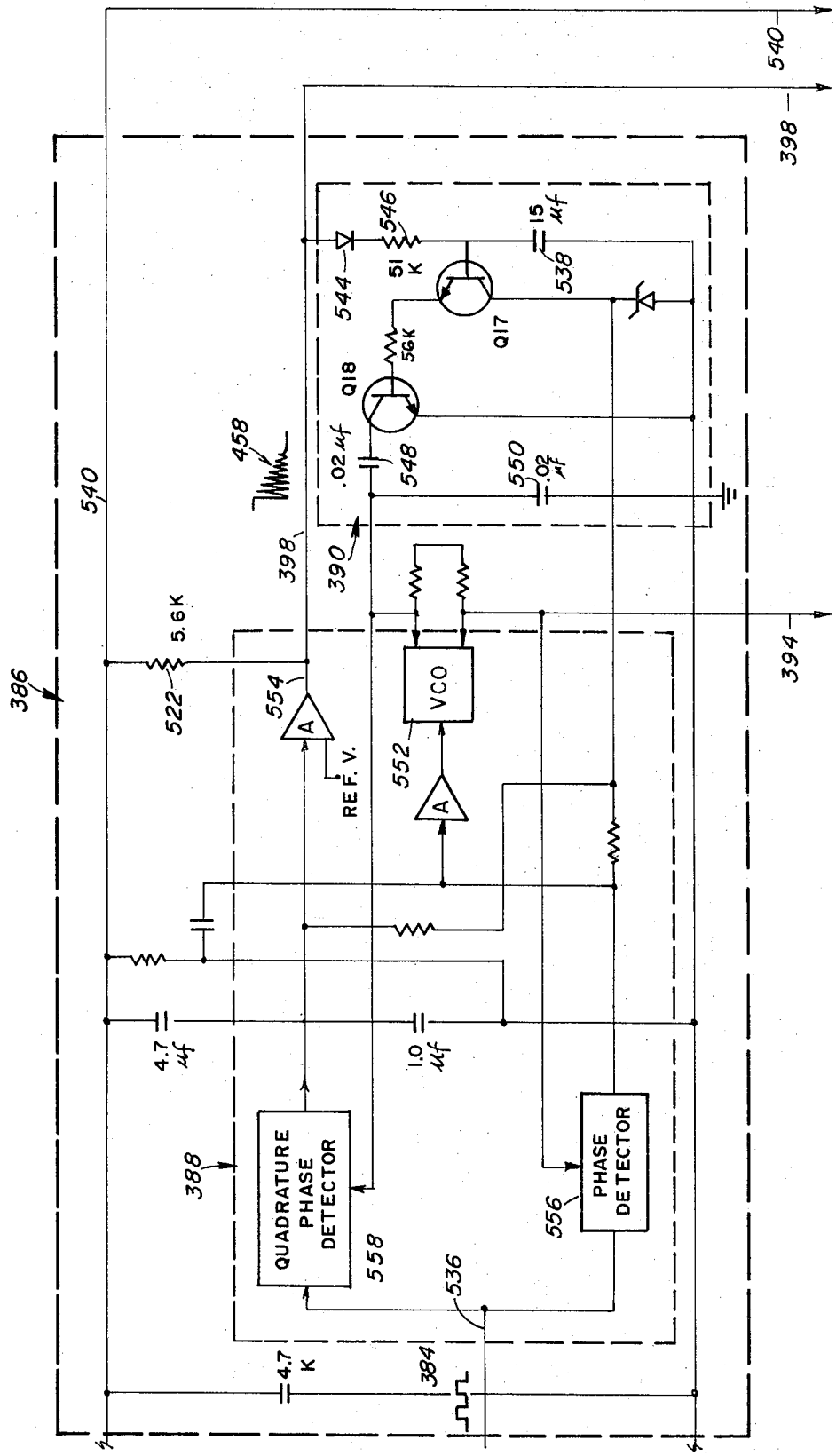

PHYSIOLOGICAL MEASUREMENT DISPLAY SYSTEM

CROSS-REFERENCE TO RELATED APPLICATIONS

This application is a continuation-in-part of the following U.S. Pat. applications copending with the present application, but now abandoned: Ser. No. 199,675, of Charles H. Fuller, filed Nov. 17, 1971, for a "Physiological Testing System;" Ser. No. 200,368 of Carl E. Herring, filed Nov. 18, 1971, for a "Measuring and Display System; Ser. No. 199,847" of Charles H. Fuller, filed Nov. 18, 1971, for a "Physiological Transmitter"; and Ser. No. 199,979 of Charles H. Fuller, filed Nov. 18, 1971 and entitled "Bio-Medical Transmitter." The present application ia also related to the continuation-in-part application of Ser. No. 199,847 and Ser. No. 199,979 of Charles H. Fuller, which application was filed on even date herewith has been assigned Ser. No. 306,097, and is entitled "Physiological Sensor and Transmitter."

BACKGROUND OF THE INVENTION

The present invention relates, in general, to the field of bio-medical telemetry, and more particularly to a system for receiving data which has been monitored by a sensor-transmitter and displaying that data. The invention is described in connection with its primary use, that of receiving and displaying transmitted data relating to the measurement of a physiological parameter such as the temperature of a patient, thus providing a telethermometer system for use in a clinical or ambulatory setting.

The detection and measurement of physiological data has become a highly developed art in recent years, and many systems have been designed for this purpose. Such systems have included sensors of various types which are secured to a patient to detect various phenomena and which produce electrical signals carried by means of electrical leads to suitable measuring and display equipment. However, for many purposes the requirement for a cable connection between a measuring or display device and a sensor secured to a patient is undesirable, for it is uncomfortable and substantially restricts his freedom of movement. Accordingly, telemetry systems have been developed which utilize a small, self-contained transmitter in combination with the sensor, the unit being used to transmit the sensed data to a remote receiver. Such systems are described, for example, in the applications related to the present application, identified above, all of which are assigned to the assignee of the present case. Typically, in such systems the transmitters utilize a suitable blocking oscillator which has a resonant circuit, the inductor of which serves the dual function of tuning the oscillator and generating a radio frequency field which may be detected by a receiver system. As disclosed in the aforementioned related applications, the blocking oscillator is modulated by a sensor to emit bursts or pulses of radio frequency energy at a rate that corresponds to the magnitude or other characteristic of the parameter being monitored.

The physiological parameter to be measured may be the temperature, blood pressure, cardiac (ECG) voltage, or other condition of a human patient. Where, for example, the temperature of a patient undergoing medical observation is to be monitored, a sensing element such as a thermistor is employed to sense the temperature and to vary the output pulse rate in accordance with the monitored value. It will be apparent, however, that such a monitoring-transmitting system will have many applications outside the medical field.

In order to utilize a wireless system for measurement of physiological parameters, great care must be taken in designing both the transmitter and the receiver to insure a high degree of accuracy both in the transmission and in the reception and display of the monitored data, for the results of such measurements may often be critical to the health and safety of the patient. Accordingly, the design of both the transmitter and the receiver-display unit must take into account the numerous factors which can affect such measurements. In the prior art, attempts to do this have led to exceedingly complex systems which are not only expensive, but because of their complexity are not entirely reliable. Further, where the transmitter and receiver are not carefully matched, inaccuracies can arise due to differences in the response characteristics of the two units, making them unsatisfactory. In addition, in any practical use of the system, it will be desirable to employ a single receiver in combination with any one of a plurality of transmitters so that, for example, a sensor-transmitter can be placed on a number of patients on adjacent beds in a single room, and the receiver can be utilized to provide a display of the temperature of one and then another, without interference, and with a high degree of accuracy.

Prior receivers for such systems have suffered problems of instability due not only to interference from outside sources, but from jitter of the received pulses and from an inability to respond to weak signals. Such systems will often respond to harmonics of the desired signals rather than, or in addition to, the desired signals, thus producing inaccurate readings. In addition, many receiving units have local radio frequency oscillators in an attempt to improve their response to transmitted signals, but such units have instead compounded the problem by producing their own radio interference. Occasionally, prior systems would respond to a partial signal that would produce a partial and thus inaccurate reading, which, if not recognized by the operator, could result in an injury to the patient.

Finally, the complexity and thus the high cost of prior devices, together, with their inadequacies as to operation, have seriously detracted from the commercial application of such systems. Attempts to overcome these difficulties have led to designs in which the response of the receiver is relatively slow, and the delays produced in such units together with their inaccuracies and unreliability have made them unsatisfactory to potential users.

SUMMARY OF THE INVENTION

Accordingly, it is an object of the present invention to produce a receiver for use in a telemetry system for monitoring physiological parameters which will produce an accurate and reliable indication of the parameter being monitored.

It is a further object of the present invention to provide a receiver for a physiological telemetry system which is capable of receiving a pulse frequency modulated signal from a sensor-transmitter, and displaying accurately, and in a relatively short time, the information so received.

It is another object of the present invention to produce a receiver which is capable of detecting a pulse modulated signal in the presence of noise and rapidly and accurately providing a display of the sensed signal data.

It is a further object of the present invention to provide a receiver which is capable of producing a readout display of a received data and which compensates for nonlinearity in the characteristics of the transmitter.

It is a further object of the present invention to provide a small, portable, easy to use, and reliable receiver for displaying a numerical representation of a monitored parameter.

It is another object of the present invention to provide a small portable, battery-operated receiver which will obtain accurate readings over a short period of time, without resorting to complex coding systems, will provide a stable response to weak signals and in the presence of interference, and will prevent the display of an inaccurate readout in the event of an incomplete measurement.

It is a further object of the invention to provide a method of detecting a physiological parameter of a subject by locating a sensing element on the patient, developing in a transmitter winding bursts of magnetic field energy at a burst rate corresponding to value of the parameter, receiving the bursts of magnetic field energy, and measuring the frequency at which the bursts occur to provide an indication of the value of the physiological parameter.

These and other objects of the invention are accomplished through the provision of a sensor-transmitter which is mounted in a small compact housing which may be removeably secured to a patient as by means of a double-faced adhesive sheet. The housing for the sensor-transmitter is constructed of a molded plastic which is formed to provide a specific chamber for each component of the transmitter circuitry to assure that the various components are correctly located for optimum operation of the device. The components are so arranged that the normal component leads may be used to provide the required interconnection between the elements, providing speed and reliability of assembly. The battery supply for the unit is located within the transmitter antenna winding and is accessible by way of an opening in the housing to permit battery replacement. The sensor device is secured to the exterior of the housing and connected to appropriate leads which extend through openings in the housing. Also extending through openings in the housing are a pair of switch leads which are mechanically separated to hold the circuit in an inoperative condition to assure a long shelf-life for the unit. A switch cover is provided to mechanically interconnect the switch leads to activate the device, the switch cover snapping into place to provide a substantially permanent activation of the unit which lasts until the battery must be replaced.

The transmitter circuitry comprises a blocking oscillator which is capable of producing bursts of radio frequency energy, with the bursts being repetitive at a rate determined by the sensor unit. In a preferred embodiment, this sensor is a thermistor adapted to measure the temperature of a patient, although other forms of sensor may be used equally well. These bursts of radio frequency energy are generated in a resonant tank circuit which includes an inductor, the windings of the inductor also acting as the antenna for the transmitter device.

While the term transmitter is used in describing this invention, it will be understood that the term does not necessarily imply the transmission of waves by a well-known radio techniques to a remote receiver miles away. Radio frequency signals that are transmitted by an ordinary radio antenna system may, of course, be detected by a receiver located in a far-field region, but such signals may also be detected in a near field region, or area. The boundary between the two regions is generally considered to be located a distance of approximately seven wave lengths from the transmitter antenna. The energy emitted from the antenna and attributable to these two fields is characterized by different fall-off rates or by different relations between the alternating magnetic components and the alternating electrical components of the field. For example, in a far-field area, the electric and magnetic field strengths are proportional to each other and the amplitude of each falls off inversely with the distance. Within the near-field area neither of these relations exists. The alternating electric and magnetic fields in the near area are not proportional to each other, nor are they in the same phase relationship. This "near field" is often known as the induction field. These effects are discussed briefly in "Radio Engineer's Handbook," by Frederick Emmons Terman (McGraw Hill, 1943). It is to be noted that the electric induction field and the magnetic induction field in the near field fall off at rates which vary inversely as a low power of distance; for example, they vary inversely as the distance or as the square or as the cube thereof.

This invention is primarily useful in an even closer range, called the "extreme near field" region; in this region the transmission of energy from the transmitter to the receiver occurs by magnetic induction, and the action is in the nature of that of a loosely-coupled transformer. However, the primary winding and secondary windings are not wound on a common core, and the transmitter and receiver form separate units that may be moved about independently of each other. In other words, the relation between the transmitter and receiver is of the wireless type. In the best embodiment of this invention, the antenna is in the form of a primary winding that encircles a tubular soft ferromagnetic core in the shape of a hollow cylinder with open ends, and the receiver employs an antenna in the form of a secondary winding of similar construction. With such a transformer, the strength of the induced field falls off at a much more rapid rate than either the far field or the near field ordinarily under consideration in a radio transmission system. Although such a field characteristic is ordinarily undesirable in a telemetry system for bio-medical purposes, where a condition of a patient is being observed the requirements of accuracy and reliability are paramount, and thus the present invention operates in such a manner.

To operate in the extreme near-field region, the parameter-sensing transmitter is mounted on and is in direct contact with the patient, and the receiver is located within a few feet of the transmitter, that is, within a distance which is only a small fraction of a wave length. With one such arrangement employing a carrier frequency of about 4.2 mHz (megaHertz), the signals strength was $103\mu V$ (microvolts), $7\mu V$, $0.3\mu V$, and $0.1\mu V$, detected at distances of 3 inches, 9 inches, 27 inches, and 52 inches, respectively, in the same direction from the transmitter. This represents a fall-off rate corresponding to a power of about 2.75 of the distance. That is, the detected voltage varied inversely as the 2.75 power of the distance from the center of the transmitter. These signals were measured in the equatorial plane of the transmitter i.e., in the plane normal to the axis of the transmitter coil.

The region in which the detectible radio frequency energy falls off in such a rapid manner may be referred to as the extreme near field region. The outer boundary of the extreme near field region, though not precisely defined, is referred to as its minimum useful range or the transitional coupling region. The range of this extreme near region is only one or two meters, being only a small fraction, such as 1% or 2% of the wave length.

In the specific embodiment of this invention described in detail below, the wave length of the radio frequency carrier wave is 70 meters, and the measurements are made with the receiver located 2 meters or less from the transmitter.

It will be understood that the far-field component, the near field component, and the transformer-action component may all exist concurrently in the same area. However, at very short range the transformer-field component predominates, beyond that range and up to about seven wave lengths the so-called near field component predominates, and beyond about seven wave lengths the far field component predominates. Although the transmitter in its best mode of practice is particularly suitable for use only in the extreme near field transformer action region, in some of its forms it is useful in other regions.

The receiver is a high gain unit that is tuned to pick up the pulses generated by the transmitter and to convert them into square wave audio frequency signals having a frequency corresponding to the burst rate of the transmitted signals. These square wave signals are fed to a locking circuit, which produces a pulse train having a repetition rate equal to that of the average rate of the transmitted signals, and which eliminates the effects of pulse rate jitter, transients, harmonics, and the like. As soon as a lock-on condition occurs, the locking circuit feeds its pulse train output into a converter logic circuit. This logic circuit includes a very stable clock oscillator which operates at a preselected rate to feed a preset number of pulses (e.g. 632) to a display counter. The logic then produces a short delay, after which an additional number of pulses from the locking circuit pulse train are also fed to the display counter. The pulse train is fed to the display counter during a predetermined time period, with the exact number of pulses reaching the display counter being dependent upon the rate of the received signals, and thus upon the parameter being measured. The sum of these two pulse counts is then displayed to provide a numerical readout which corresponds to the sensed parameter.

Since the frequency output of the transmitter is not linear with a given change in the measured parameter, a digital feedback is provided in the time base circuit of the receiver logic to correct for this non-linearity.

The receiver unit is a small hand-held unit having a display face on which are located four incandescent numerical display tubes, each having seven segments for displaying the numbers zero through 9. A display push button is provided on the receiver and when the unit is within the range of a transmitter, the button may be depressed to start the measuring and display operation. The received signals are counted, and at the completion of the count the display is unblanked and latched to produce a display of the received count which will be held until the push botton is released. With the present improved system, an indication of the received data is provided within 0.4 seconds. If the count is not acquired by the receiver system for some reason, the push button must be depressed again to obtain the desired reading.

The display lamps are continuously biased on by a small current so that the incandescent filaments will be energized just below the visible level, thereby permitting a faster and brighter display when a reading is acquired. If desired, the display of the receiver unit may also be used to provide a time multiplex output for recording purposes or for computer input.

The receiver unit is battery powered, with a full charge permitting over 1200 readings at two seconds each or a single reading for 45 minutes. The batteries are rechargable, and for this purpose a charging stand is provided on which the receiver unit may be placed during periods of non-use. With a regular recharging, a single receiver unit may be used to monitor approximately 400 patients, obtaining four readings in every 24 hours, on a continuous basis.

BRIEF DESCRIPTION OF THE DRAWINGS

The foregoing and additional objects, features, and advantages of the present invention will become evident to those skilled in the art upon a reading of the following detailed description thereof, taken in conjunction with the accompanying drawings, in which:

FIG. 14 is a graphical illustration of the waveforms appearing in the circuit of FIG. 12;

FIGS. 15A–15E are a schematic and partial block diagram of the circuit of FIG. 12;

DETAILED DESCRIPTION OF PREFERRED EMBODIMENTS

Figure 1:
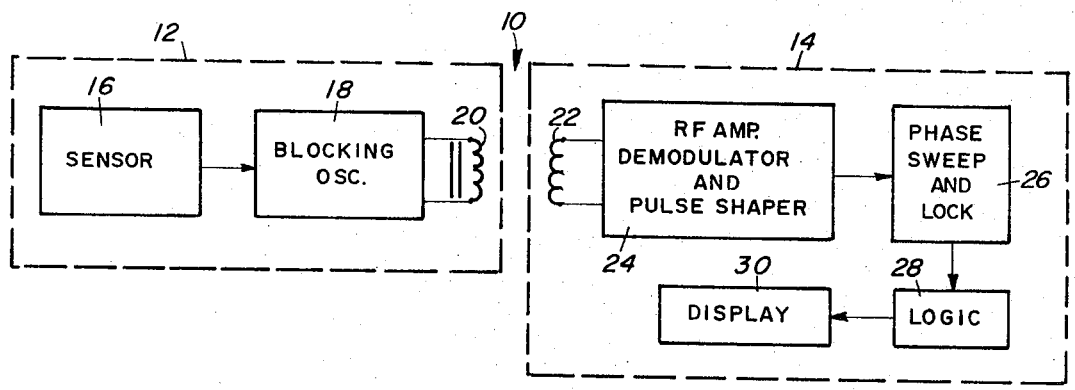
FIG. 1 is a block diagram of a transmitter and receiver system embodying the present invention.

Turning now to a consideration of the present invention, there is illustrated in FIG. 1 a telemetering system generally indicated at 10 embodying the present invention. For purposes of illustration, the invention is described herein in terms of a temperature sensor for use in monitoring, over a substantial period of time, the temperature of, for example, a hospital patient. For convenience, the system may be referred to as comprising a telethermometer transmitter, or sender, assembly 12, and an associated telethermometer receiver and display assembly.

The sender unit 12 includes a sensor 16, such as a thermistor or other temperature-variable component, a pulse rate detector, a blood-pressure detector, or similar device which will produce an output that serves to modulate a carrier wave generator, such as a blocking oscillator 18. The oscillator output appears on an antenna winding 20 which is wound on a ferromagnetic core and serves not only as the antenna for the sender unit, but as the inductive component of the resonant circuit for the oscillator. The transmitter oscillator generates an alternating current which passes through antenna 20 and generates an alternating magnetic field that varies at radio frequency, this RF output being pulse frequency modulated at a burst rate corresponding to the temperature or other parameter to which the sensing element 16 is exposed. The transmitter unit 12 is of very low power, being driven in the preferred embodiment by a single energy cell which, when activated, will provide an operating life of at least two weeks.

Over its period of operation, the transmitter will continuously produce bursts of RF energy at a burst rate corresponding to the measured parameter and with an accuracy that meets applicable requirements. These pulses, or bursts, each have, in an exemplary embodiment of the invention, a width of 15.2 microseconds, with the RF carrier frequency of the pulse having its spectrum centered at 4.2 megaHertz (mhz). In a preferred embodiment, the pulse rate is set at 1,831 pulses per second (pps) at a sensor temperature of 101°F., with the pulse rate versus temperature characteristic of the unit having a positive slope of approximately 48.2 pps per degree F. Only the pulse rate varies with temperature, the remaining operational characteristics of the sender unit remaining stable. The battery current drain at this pulse rate is approximately 32.1 microamperes, enabling the device to operate continually for about 2 weeks without varying from the required pulse rate tolerances.

The transmitter assembly is packaged in a housing which requires a volume of less than one-fourth cubic inch and is enclosed in a soft cellular urethane cover on one side and an adhesive pad on the other to permit attachment of the device in direct contact with the part of the body where, for example, is to be detected. Alternatively, the transmitter may be implanted surgically, may be ingested, or may be applied in a suppository manner, to place the sensor unit in proper relationship with the part of the body where the parameter is to be sensed.

The transmitter and receiver units are entirely separate, with the receiver being portable for use by medical personnel in measuring the temperature of a patient. The receiver is a hand-held remote digital indicator which is battery powered and, when located within a short distance of a single transmitter, is sufficiently selective in its response to enable the operator to obtain an accurate reading. Although the preferred range of response to a transmitter is less than 3 feet, accurate readings can be obtained at a greater distance and, where other sensors do not interfere, the receiver is capable of providing accurate readings seven feet or more away from the transmitter. The receiver 14 is not affected by interference from ordinary radio frequency noise that may be present in the environment of the system, particularly where the receiver is located within the transformer action region of the sender unit.

The receiver unit 14 incorporates a loop antenna 22 which intercepts the signals transmitted by sender unit 12 and feeds them through a demodulator and pulse shaper network 24 to convert the received signals into square wave pulses at the audio frequency of the transmitter burst-rate modulation. The d.c. pulses produced by the wave shaper have a repetition frequency which corresponds to the sensed parameter, and these signals are applied to a phase sweep and locking circuit 26 which operates to lock a multivibrator to the average frequency of the received signals, thereby producing a square wave signal which represents the monitored parameter, but which is free of pulse jitter and interference.

This pulse train is fed to a logic circuit 28 which includes a clock circuit that generates pulses at a fixed frequency. The logic circuitry gates the clock circuit for a first period of time, feeding clock output pulses to a display unit 30 which includes a display counter. During this first period of time, a predetermined number of pulses are fed to the display counter and are stored there. Thereafter, the logic circuitry gates the output of the phase sweep and lock circuit multi-vibrator 26 to the display counter 30 for a preselected length of time, allowing a number of pulses from the pulse train produced by circuit 26 to be fed to the display counter 30, the exact number of pulses depending upon the pulse rate. At the end of this second time period, the logic circuitry is locked and the display is unblanked, producing a readout of the total number of pulses received by the display counter. This readout is a digital representation of the monitored parameter. In the preferred embodiments disclosed herein the receiver unit logic circuitry and display are calibrated to produce a readout of a detected temperature in degrees Fahrenheit.

A sender unit suitable for use with the receiver disclosed herein is described in copending application Ser. No. 199,847, now abandoned, of Charles H. Fuller, filed Nov. 18, 1971 for a "Physiological Transmitter." This transmitter is also disclosed in copending application Ser. No. 199,979, now abandoned of Charles H. Fuller, filed Nov. 18, 1971 and entitled "Bio-Medical Transmitter." An improved transmitter unit which is preferred for use in the system of FIG. 1 is described in copending application Ser. No. 306,097 of Charles H. Fuller, filed Nov. 13, 1972, for a "Physiological Sensor and Transmitter," which application is a continuation-in-part of the aforementioned Ser. No. 199,847 and Ser. No. 199,979.

Figure 2:
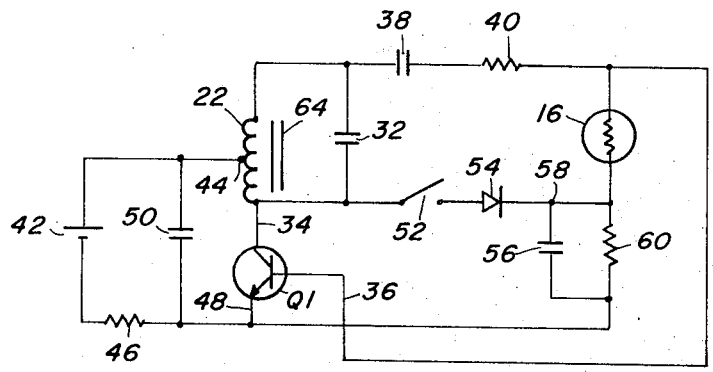
FIG. 2 is a schematic diagram of a transmitter circuit useful with the sensor-transmitting unit of the system of FIG. 1.

As disclosed in the aforesaid continuation-in-part application, and as illustrated in FIG. 2 herein, a suitable transmitter may consist of a small, compact blocking oscillator consisting of a transistor Q1, and a parallel resonant circuit consisting of the antenna winding 20 and a capacitor 32 connected between the collector 34 of Q1 and the base 36 thereof. Connected in series between the resonant circuit and the base 26 is a feedback blocking capacitor 38 and a series isolating resistor 40. Power is supplied to the circuit by a miniature battery 42 which, when an npn transistor is used, has its positive terminal connected to a tap 44 on winding 20 and has its negative terminal connected through a resistor 46 to the emitter 48 of the transistor Q1. A storage capacitor 50 is connected between tap 44 and the emitter 48 to shunt the battery supply 42 and provide a stable power source. The collector 34 of transistor Q1 is connected through a mechanical switch 52 and a diode 54 to a storage capacitor 56 to provide a higher voltage source for the feedback circuit of the oscillator. The junction 58 between diode 54 and capacitor 56 is connected through the sensing element 16, which in this embodiment is shown as a thermistor, or temperature sensitive resistor, to the base 36 of transistor Q1. A resistor 60 shunts capacitor 56.

In operation, when the switch 52 is in its closed condition, the circuit oscillates at a carrier frequency in the radio frequency range, as determined by the inductance and capacitance values of winding 20 and capacitor 32. Due to the charging and discharging of the control, or feedback, capacitor 38 the oscillations are periodically excited and then cut off to generate recurring bursts of energy at the RF frequency. The rate at which these bursts recur is determined by the value of the resistance of thermistor 16, which provides a charging path from the high voltage source provided by storage capacitor 56 and the feedback capacitor 38. Variations in the value of resistance 16 cause corresponding variations in the rate at which bursts of energy occur in the resonant circuit, whereby such bursts are a function of measured temperature. These RF bursts in the winding 20 produce corresponding alternating magnetic fields which may be sensed by the receiver unit 14. A more complete description of the operation of the transmitter circuitry is provided in the aforesaid applications Ser. Nos. 199,847 and 199,979, as well as in the continuation-in-part of those applications, Ser. No. 306,097.

Figure 3:
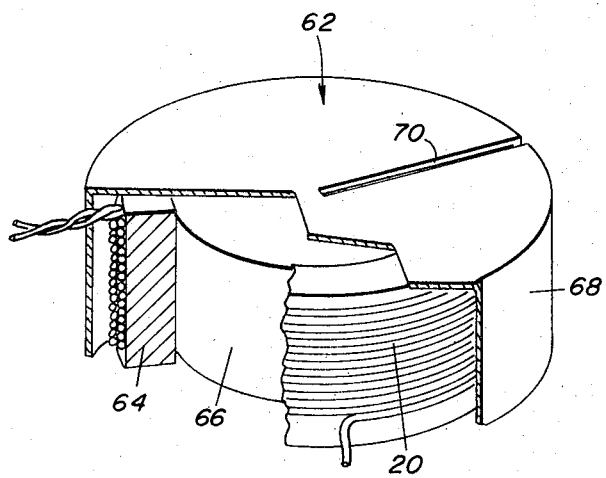
FIG. 3 is a partial perspective view of an antenna winding suitable for use with the transmitter unit of FIG. 1.

As illustrated in FIG. 3, the transmitter unit 12 utilizes an antenna assembly 62 which comprises a tubular core 64 about which is wound the resonant circuit winding 20. The core may be composed of iron carbonyl, and is designed to encompass the sensor-transmitter power supply battery 66 to provide a compact unit. In the best embodiment of the invention, the antenna assembly 62 is electrostatically shielded, as by a coating 68 of zinc, which is sprayed onto the outside of the winding 20, over the top end of the dry cell battery 66, and over the top end of the iron sleeve, or core 64. During the spraying of the shield, a mask is held in place to form a break line 70 in the zinc shield, thereby preventing the shield from forming a short circuited secondary winding with the transmitter winding 20.

The electrostatic shield 68 thus is in the form of an inverted cap-shaped shield member electrically connected to the upper terminal of the battery 66 and embracing the battery, the core 64, and the winding 20, thereby precluding electrostatic interference with the resonant circuit of the transmitter.

It has been found that the electrostatic shield 68 may often be omitted from the transmitter antenna, particularly where the electrostatic fields that occur in the environment in which the transmitter is often employed do not interfere sufficiently with the operation of the transmitter to seriously impair its operation and thus where the improved operation afforded by the device by the use of such a shield would not justify the increased costs. However, such a shield may be essential in some environments to assure accurate and reliable operation of the system.

The core 64 consists of comminuted soft iron particles oxidized in a carbonyl atmosphere and dispersed in a non-magnetic non-conductive binder such as epoxy resin. Such a powdered iron core has the characteristics of low eddy current losses, the ability to be easily machined, the capability of close dimensional tolerance, a change in permeability of less than 5% after a 400 to 500 Gauss field has been applied and removed, and a retentitivity after a magnetic field is removed of less than 5%.

When the core 64 is machined prior to application of the windings, for example, to form grooves for receiving these windings, the powdered iron particles come into electrical contact with each other, thereby introducing a leakage path between the poles of the battery 66 and increasing RF losses in the iron. To avoid such losses, the core is treated in an acid bath to etch the surface, thereby restoring insulation between the ferrous oxide particles.

The tubular core has the advantage of reducing the loading of the antenna winding 20 and reducing the number of turns required in that winding. This, in turn, reduces the power loss in the winding and provides the transmitter with greater range and longer life.

Figure 5:
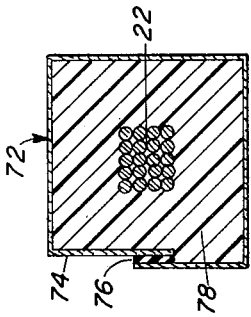
FIG. 5 is a cross-sectional view taken along lines 5—5 of FIG. 4.
Figure 4:
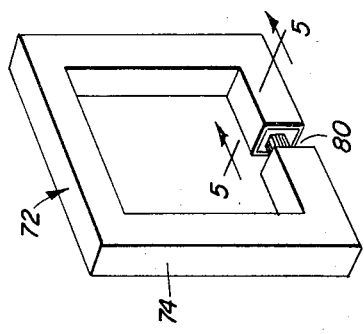
FIG. 4 is a perspective view of an antenna suitable for use with the receiver unit of FIG. 1.

The receiver 14 includes an antenna winding 22 which is illustrated in FIG. 4 and 5. This antenna preferrably is a square loop approximately two inches long on each side and is generally indicated at 72. The receiver antenna assembly 72 incorporates the coil 22, which comprises approximately twenty turns of copper wire, and is formed with a tubular electrostatic shield 74. This shield has lapped edges that are electrically insulated from each other by means of an insulator strip 76. A spacer material 78 of a vinyl foam or other material having a low dielectric constant is provided to space the winding from the shield 74. An opening 80 (FIG. 4) is provided between opposing ends of the electrostatic shield to provide a passageway for the coil leads, whereby the receiver circuitry may be connected to the antenna assembly. The electrostatic shield on the receiver winding almost completely eliminates the effect of outside interference from nearby electrostatic fields, and thus increases the signal to noise ratio of the received signal.

When the receiver unit 14 is located within the range of a transmitter unit 12, signals from the transmitter magnetically induced in the winding of the receiver antenna are fed by way of an RF amplifier 81, an input line 82, a demodulator 84, and a pulse shaper 86. In the demodulator illustrated in FIG. 6 an automatic gain control signal is provided to control the amplitude of the signal being fed to the demodulator, so that if two or more signals are being received from different transmitters, the pulses appearing at the output will correspond to the rate of the bursts of the strongest received signal. This burst rate is sometimes referred to as the dominant burst frequency.

Figure 6:
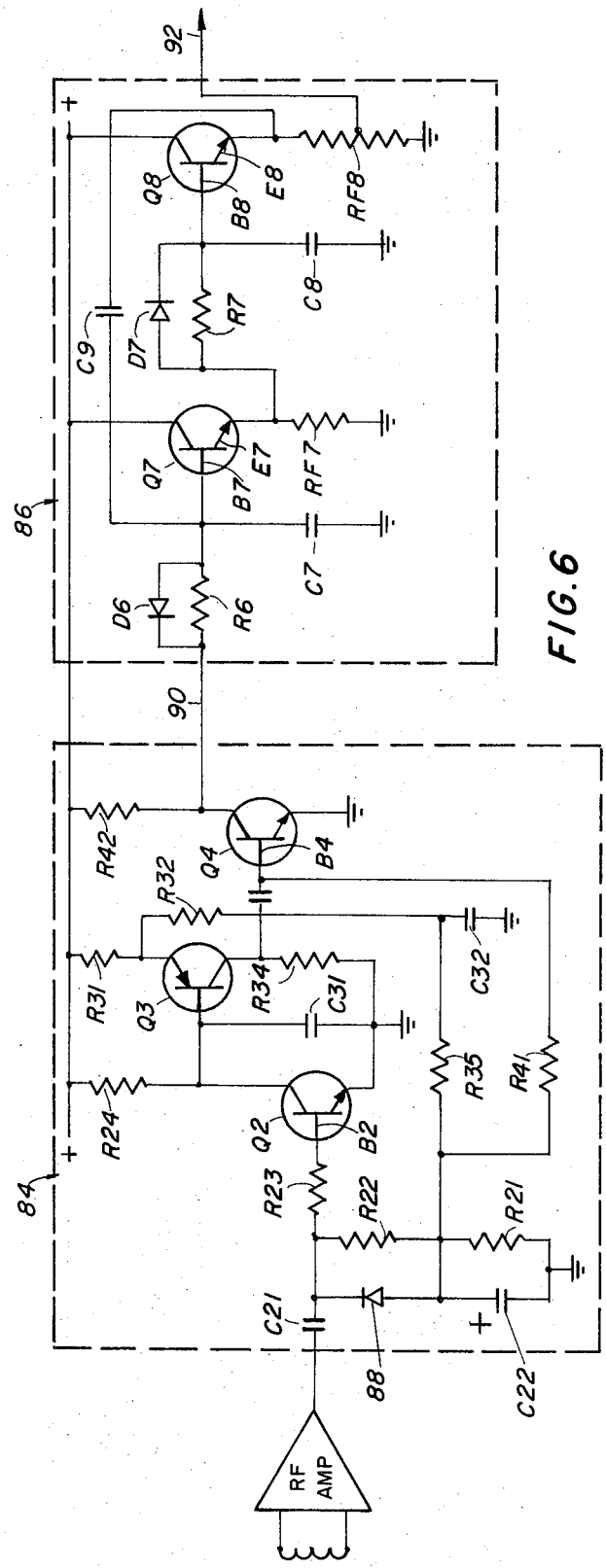
FIG. 6 is a schematic diagram of a demodulator and pulse shaper circuit for use with the receiver unit of FIG. 1.

Referring to FIG. 6, radio frequency waves amplified in a conventional RF amplifier 81 are fed to input 82 of the demodulator 84. The demodulator includes three transistors Q2, Q3, and Q4. A diode 88 at the input of the demodulator prevents the input signals from exceeding a predetermined level, thus avoiding overload. Also, in order to prevent overloading of the demodulator, the radio frequency amplifier 81 has a fast automatic gain control circuit which acts upon any strong signals having a duration of more than a few microseconds.

The first transistor Q2 amplifies the positive peaks of the incoming radio frequency signals. These amplified signals are again amplified by the transistor Q3, developing a signal across a load resistor R34.

The amplified signals appearing across the collector resistor R34 are applied to the base emitter junction B4 of transistor Q4. The amplified signals that are developed across the collector resistor R34 are of the range of about 0.5 to about 6.0 volts, that is, in excess of the base to emitter forward voltage that can be sustained in the transistor Q4. As a result, a negative automatic gain control voltage corresponding to the excess about +0.5V is developed and is applied through the resistor R41 to the base B2 of the transistor Q2 through an RC circuit that has a time constant that is much longer than the interval between successive bursts.

The pulses appearing at the base B4 of the transistor Q4 are positive and of short duration and those that appear on the output line 90 of the demodulator are negative but are of long duration. These longer negative pulses appearing at the output line 90 appear at a rate equal to the burst rate of the strongest series of bursts being received.

Characteristics of circuit elements satisfactory for use in the demodulator 84 and the pulse shaper 86 are the following:

| | |
|---|---|
| C21 – 0.05μF | R35 – 1.3M |
| C22 – 4.7μF | C32 – 0.001μF |
| R21 – 100K | R41 – 51K |
| R22 – 15K | R42 – 4.3K |
| R23 – 470K | Q7 – 2N3565 |
| Q2 – 2N3565 | Q8 – 2N3565 |
| Q4 – 2N3565 | R6 – 150K |
| R24 – 51K | C7 – 0.001μF |
| C31 – 100μF | RF7 – 13K |
| Q3 – 2N4249 | R7 – 100K |
| R31 – 51K | C8 – 0.001μF |
| R32 – 100 | RF8 – 6K |
| R34 – 15K | FBC – 0.001μF | where K means kilohms, M means megohms and μF means microfarad.

The pulse shaper 86 is, in effect, a broad band pass filter which has its center frequency at about 2,000 cps and a band width that extends from about 1,600 cps to about 2,400 cps. As used here the term band-width refers to the range of frequencies over which the pulse shaper operated effectively to produce a quasi-sine wave output having a frequency equal to the burst rate. The pulse shaper employed here does not have all the characteristics of the usual type of filter employing inductors and capacitors. More particularly, if a pulse is missing from the input a sine wave will be missing on the input. But as long as the input pulses are recurring regularly, it produces an effect similar to that of a band-pass filter. An ordinary band-pass filter can be shock exicted and would then continue to ring. Such ringing effects are absent from this pulse shaper.

The pulse shaper 86 comprises an amplifier employing two transistors Q7 and Q8, with positive capacitive feedback and two parallel resistor-diode networks, one at the input and one between the two amplifier stages, to provide a non-linear active filter. Both amplifier stages are in the form of resistance loaded emitter followers, which inherently have a gain that is slightly less than unity. Sharp negative-going pulses are fed from the collector of the transistor Q4 of the demodulator 84 to the input of the pulse shaper 86 by way of line 90 to produce quasi-sinusiodal waves at the output 92 of the pulse shaper.

A resistor R6 and a diode D6 are connected in parallel between the input 90 and the base B7 of the transistor Q7. A capacitor C7 is connected between the base B7 and ground. A resistor RF7 is connected between the emitter E7 of the transistor Q7 and ground, with a resistor R7 and a diode D7 being connected between E7 and the base B8 of the transistor Q8. A string of resistors RF 8 is connected between the emitter E8 of transistor Q8 and ground, also providing an emitter-follower arrangement. A feedback capacitor C9 is connected between the emitter E8 of the output transistor Q8 and the base B7 of the input transistor Q7.

It is to be noted that the diode D6 has its anode connected to the base B7 of the input transistor Q7 and also that the cathode of the diode D7 is connected to the base B8 of the transistor Q8.

Initially it is helpful to consider the operation of the pulse shaper with the feedback path open. Under these conditions, when a negative pulse is applied to the input 90, the capacitor C7 discharges through the diode D6 and transistor Q4. During the silent period awaiting arrival of the next negative pulse at the input the capacitor C7 charges up slowly. The wave form occurring at emitter E7 is the same as that at the base B7. The opposite effect occurs with the transistor Q7 and the resistor R7, diode D7, and capacitor C8. As a result, a substantially triangular wave appears at the base B8 and emitter E8 of transistor Q8.

A phase shift occurs between the signal at the input 90 of the pulse shaper and the base B7 of the input transistor Q7. This phase shift is asymmetrical, being large for a positive voltage and small for a negative voltage across the resistor R6. This difference is due to the rectifying effect of the diode D6; that is, the resistance of the diode is high for such a positive voltage and is low for such a negative voltage. A phase shift also occurs between the signal at the emitter E7 of the transistor Q7 and the base B8 of the transistor Q8. This phase shift is also asymmetrical, but is small for a positive voltage and large for a negative voltage across the resistor R7. This difference is due to the rectifying effect of the diode D7, that is, the resistance of the diode is low for such a positive voltage and is high for such a negative voltage.

The effect of these two stages of resistor-diode network is to convert sharp pulses into broad triangular pulses. At the center frequency, this triangular wave is substantially isosceles. It has been found that by closing the feedback path and introducing positive feedback via capacitor C9 the triangular wave is modified, producing a nearly sinusoidal wave at the emitter E8 of the transistor Q8.

In operation, when the voltage at the base B7 is negative-going, the voltage at the base B8, and hence also the voltage at the emitter E8, is decaying slowly. After the voltage at the base B7 and hence the voltage at the emitter E7 has reached its most negative value, it begins to rise. But the voltage at the base B8 continues to go negative by virtue of the continuous discharge of the capacitor C8 through the resistor R7. These changes continue in the respective directions mentioned until the voltage at the base B8 reaches the value of the rising voltage at the emitter E7. At that time, the rising voltage at the emitter E7 applies a voltage to the diode D7 in a forward direction, thus forcing the voltage at the emitter E8 to follow the voltage at the base B7. With the feedback capacitor C9 connected, this voltage is returned to the base B7. The voltage tends to lag at the emitter E8 due to the effect of the capacitor C8 but tends to lead because of the effect of the capacitor C9, thus producing a smoothing action and achieving a band-pass filter effect.

The harmonic content of the output of the pulse shaper 86 depends somewhat on frequency. At about 2,000 Hz the harmonic content is minute, being less than 1%. At about 1,600 Hz and 2,400 Hz, which are the extreme pulse rates used, the harmonic content is as much as about 20%.

Figure 7:
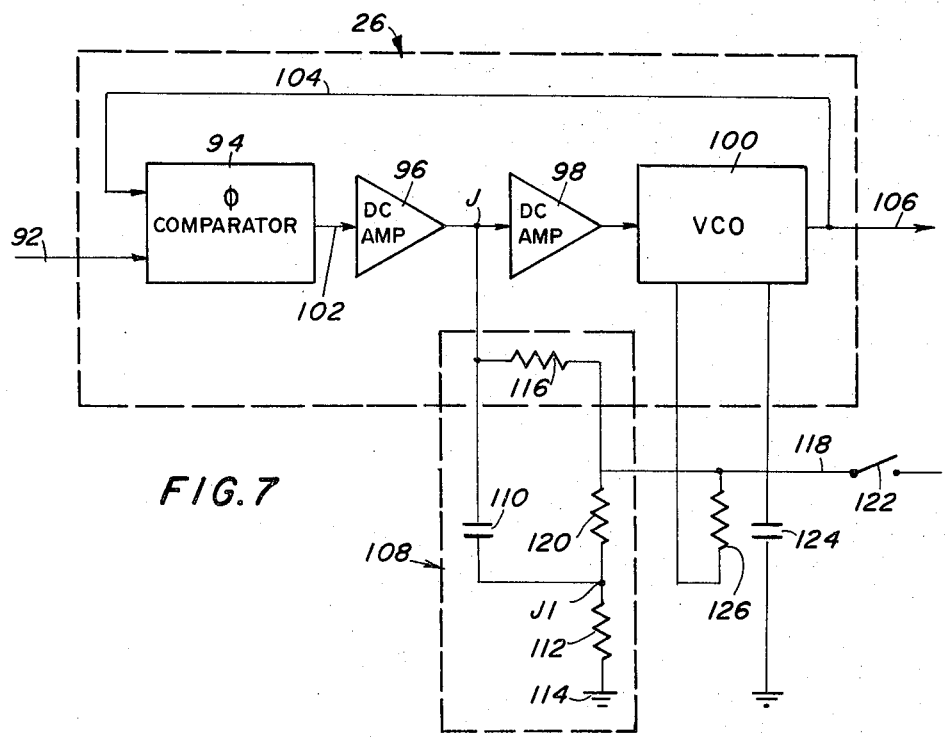
FIG. 7 is a block diagram of a phase sweep and lock circuit suitable for use in the receiver of FIG. 1.

The output signal on line 92 is then fed to the phase sweep and lock circuit 26, which is illustrated in FIG. 7 in block diagram form. The particular phase lock unit employed in this invention makes use of a Model NE565 integrated circuit manufactured by Signetics Corporation of Sunnyvale, Calif. The phase lock unit, which is of conventional type, employs a phase comparator 94, two d.c. amplifiers 96 and 98, and a voltage controlled oscillator 100. The phase comparator produces at its output 102 a voltage proportional to the difference in the phase of signals applied to two inputs 92 and 104. The two d.c. amplifiers are connected in series between the phase comparator and the voltage controlled oscillator. The sinusoidal or quasi-sine wave developed by the pulse-to-sinewave shaper 86 is applied to the input terminal 92, and a rectangular wave appears at the output terminal 106 of the phase lock unit. This output waveform is applied by way of feedback line 104 to the other input of the phase comparator. The unit operates to generate rectangular pulses at its output at the same frequency as the sine wave applied to its input.

In this invention, a control circuit 108 serves as a servo filter and as a sweep voltage source for sweeping the frequency of the voltage controlled oscillator over a predetermined range. The control circuit employs a capacitor 110 and a resistor 112 connected in series between the junction J and between the two d.c. amplifiers 96 and 98 and a common ground, or reference, point 114. This circuit also employs an input line 118 and a resistor 120 between line 118 and a junction J1 between resistors 112 and 114.

When the receiver unit is energized, as by closure of switch 122, current flows from the power line 118, charging the capacitor 110. The resultant gradually increasing voltage applied to the junction J causes the square waves developed at the output line 106 of the voltage controlled oscillator to change frequency with the changing voltage, sweeping the output from a high frequency of 3,000 Hz toward a low frequency of 1,500 Hz. As the frequency of the output signal sweeps downwardly, it approaches the frequency of the quasi-sinewaves applied to the input 92, finally coming within what is known as the capture band. When the voltage controlled oscillator 100 reaches a frequency in the capture band, the frequency of the VCO becomes rapidly phase-locked with that of the input signals, whereby the frequency of the signals generated at the output of the phase lock unit 106 is the same as the frequency of the incoming signals. Thus, the phase lock unit develops signals at its output which have a frequency equal to the burst rate of the radio frequency signals being received from the transmitter unit 12.

An auxiliary capacitor 124 and an auxiliary resistor 126 are employed with the Model NE565 unit to establish the range of frequency over which the voltage controlled oscillator is designed to sweep. The value of resistor 120 to that of resistor 112 determines the starting voltage sweep level at junction J and thereby establishes the starting frequency and voltage sweep range of the oscillator 100. The absolute values of resistors 120 and 112 help to determine the capture band width.

The values of circuit constants that may be employed in the control circuit 108 are as follows:
Resistor 116 - 3.8K
Resistor 120 - 1.8K
Resistor 112 - 1.0K
Capacitor 114 - 47F With the arrangement shown, the control circuit 108 serves several functions. It not only provides for controlling the rate of sweep of the frequency of the voltage controlled oscillator, but is also sets the sweep frequency by controlling the sweep voltage range for a given set of values of the resistor 126 and the capacitor 125. The control circuit provides for sweeping the frequency of the oscillator only once when the power is turned on, since the sweep ends when capacitor 110 is fully charged, and provides a stepped low pass filter for the servo function required in a phase lock unit. It also acts as a memory element which enables the circuit to fill in missing pulses if bursts are missing now and then from the incoming signals, since it is the VCO which produces the output pulses for the unit, and the VCO will continue to operate from the voltage on capacitor 110 if an input burst is missing. The control also serves to lock the phase lock unit to the frequency corresponding to the burst rate even though noise signals of random frequency are also present. It, therefore, controls capture band width and phase lock loop band width.

It is to be noted that the sweep frequency starts at a high value compared with the pulse rate of the signals to be detected. Among other things, this permits the system to become stabilized in operation prior to capture of the frequency of the oscillator 100. This is, the time constant of the control circuit 108 and the high frequency limit of the oscillator 100 are so selected that the telemeter receiver 14 stabilizes its operation prior to the time that the frequency of the voltage controlled oscillator comes within the capture range of the frequency of the incoming signals. In this connection, it is to be mentioned that the time constant of the automatic gain control circuit of the demodulator found to be satisfactory for this purpose in the present embodiment lies in a range between 50 ms and about 1 sec, with the particular time depending upon the strength of the received signals. This response time, it is to be noted, is longer than the inter-burst interval corresponding to the range of temperatures to be measured.

In practice, in a particular telemetering system that has been developed in accordance with this invention, radio-frequency signals were generated at a frequency of 4mHz, and burst rates were established in a range extending from about 1,600 Hz to 2,300 Hz, to correspond to a clinical temperature range extending between about 94°F. and 106°F.

In this invention, the phase lock unit sweeps over a frequency range of 1 octave or less but the pulse rate range corresponding to the temperature range of interest is less than the range of the phase lock unit and, in any event, is less than 1 octave. By employing a pulse rate range less than 1 octave and by employing a pulse shaper that converts pulses to quasi-sine waves, the possibility of the phase lock unit locking at a harmonic or subharmonic of the pulse rate is practically eliminated. Furthermore, the phase-lock circuit helps establish pulses of rectangular shape at its output when the incoming signals are weak and, therefore, of somewhat irregular shape.

Figure 8:
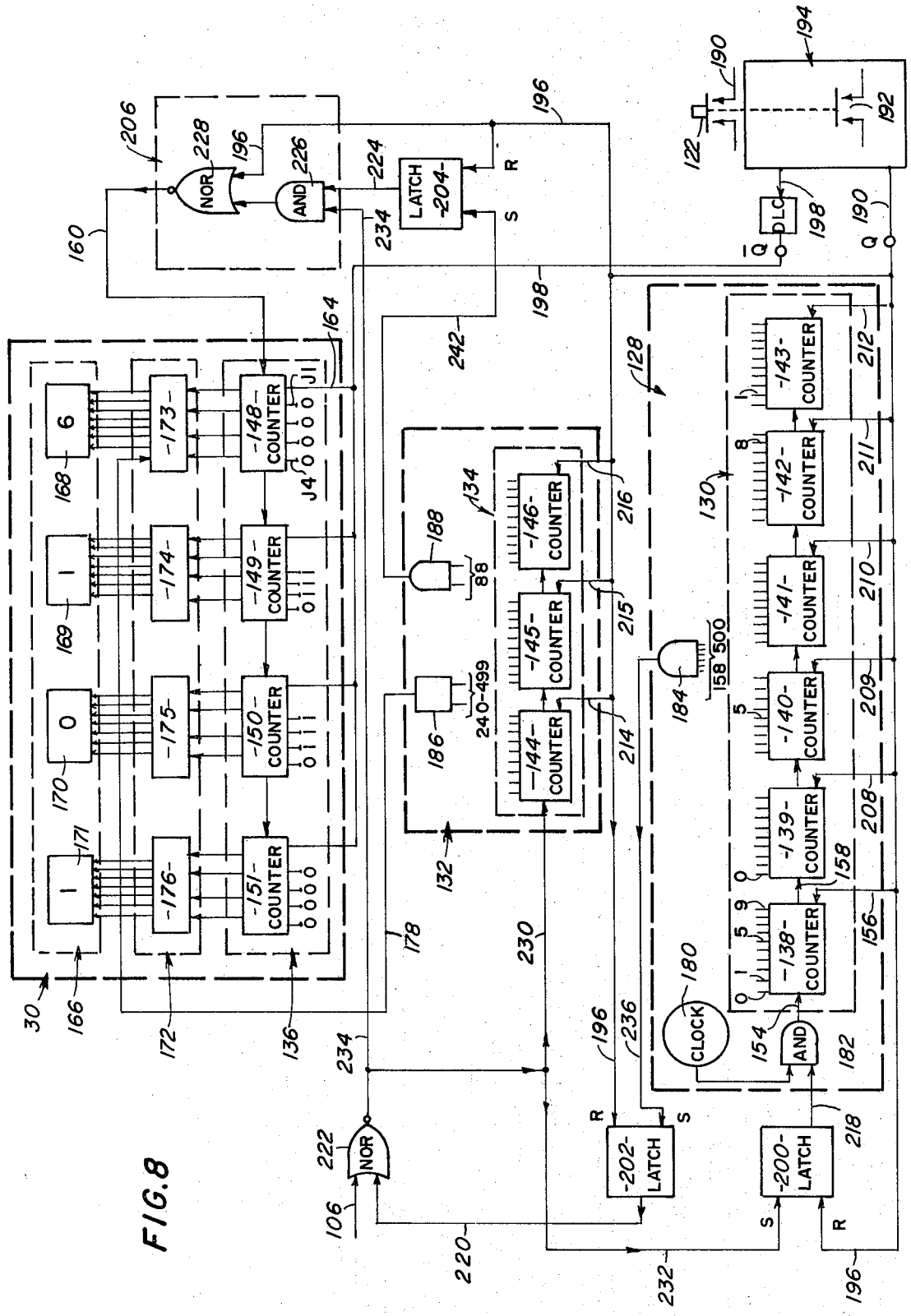
FIG. 8 is a block diagram of a first embodiment of a logic and display system suitable for use in the receiver of FIG. 1.

The stream of pulses produced by the phase lock circuit 26 is applied to the pulse rate measuring and indicating networks 28 and 30, which include a time gating unit that permits pulses to flow to a pulse counter during only a predetermined time interval. Whether the count is to be indicated by means of a counter or in some other way, the temperature of the patient may be ascertained from a determination of the pulse rate of the bursts being received from the transmitter, and may provide a direct indication of the temperature by means of suitable calibration.

Where the pulse rate versus temperature characteristic of the transmitter is linear over the measurement range of interest, the square wave output signals from the phase lock circuit may be applied by way of line 106 to a logic and display circuit such as that illustrated in block diagram form in FIG. 8, which display unit may be calibrated in any way desired. For example, it may be calibrated to display the temperature detected by the temperature sensing element 16 at the transmitter, or may be calibrated to display the deviation of the measured temperature from some reference value.

Assuming a linear output function from the transmitter, the counter of FIG. 8 is arranged to count bursts occurring within a predetermined time interval, the exact number depending on the slope of the temperature versus frequency characteristic of the transmitter, and then adds to that count a constant value to yield a total count which is a direct indication of temperature in degrees F. In the particular embodiment of FIG. 8, each burst counted during the predetermined time interval corresponds to 0.1° F. The resultant count is displayed for viewing by the person who is operating the hand held portable receiver. In the best embodiment of the invention, precautions are taken to prevent any temperature from being displayed unless the number of pulses accumulated corresponds to a temperature between a specified low limit and a specified high limit; for example, between 93°F. and 120°F.

In the embodiment of the invention represented schematically in FIG. 8, three main counting units are employed, a timer unit 128 including a timer counter 130 and a lockout unit 132 including a lockout counter 134 making up the logic network 28, and a display unit device 30 including a display counter 136. The timer counter 130 is a scale-of-1,000,000 six-stage decade counter including counter stages 138–143; the lockout counter 134 is a scale-of-1,000 three-stage decade counter including counters 144–146; and the display counter 136 is a scale-of-10,000, four-stage binary coded decimal counter having counters 148–151.

Each of the counter stages 138–143 and 144–146 is a simple decade counter having an input leg or terminal, such as terminal 154 of counter 138, into which pulses to be counted are fed one at a time. It also includes a reset terminal, such as terminal 156 of counter 138, to which a 1-signal may be applied to reset the counter to a zero count. Each counter includes ten output terminals, each of which corresponds to a digit of decimal number on a scale from 0 to 9, again as indicated at counter 138. That is, a zero signal appears on each of these terminals, except when a count has been reached within the counter corresponding to the decimal digit indicated by the designation of the output terminal 138, at which time a 1-signal appears on the output terminal corresponding to that digit. Thus, when the count is zero, a 1-signal appears at the zero terminal. When a count of 1 is reached, a 1-signal appears on the output terminal 1; when a count of 2 is reached, a 1-signal appears on the output terminal 2; and so on.

The total number of counts fed in, modulus 10, is registered and stored indefinitely and is represented by such signals on the output terminals. A carry or output terminal 158 is also provided for counter 138, on which a 1-signal appears only when a count of zero modulus 10, that is, a multiple of 10, is reached. Such an output signal is sometimes referred to as a carry signal. A 1-signal appearing at the output terminal of such a counter may be used as the input of another such counter, such as counter 139.

A second type of decade counter is represented by the counters 148–151. This counter is of the binary-coded decimal type, and includes an input terminal 160 (counter 198), to which pulses that are to be counted are applied. It also includes output terminals 1–4, at which output signals may appear, and jam terminals J1, J2, J3, and J4 (see counter 148). The legends 1–4 and J1–J4 of the jam and output terminals represent the significance of the digits in the binary system represented by the respective terminals. The jam terminals J1, J2, J3, and J4 correspond respectively to the binary numbers 1, 10, 100, and 1000; that is, they correspond to the decimal digits 1, 2, 4, and 8. Similarly, the output terminals 1–4 correspond to binary numbers 1, 10, 100, and 1000. The number on a binary scale represented by the output is the sum of the four binary numbers represented by 1-signals at the output terminals. Counter 148 also includes an output or carry terminal 162 at which a 1-signal appears when a count of zero modulus 10 has been reached.

Instead of having a reset terminal as the prior counters 138–146, these special counters 148–151 utilize auxiliary jam input terminals J-1, J-2, J-3, and J-4 which are connected in a well-known manner to enable a predetermined starting count to be inserted. Thus, by applying initializing 1-signals to any selected set of jam terminals while applying 0-signals to the others, the counter may be initially set to represent a count represented by the values of the 0 and 1 signals applied to the auxiliary terminals. Thus, for example, if a 1-signal is applied to terminals J1, and J2, and a 0-signal is applied to terminal J3 and J4 of counter 148, the counter will be initialized to a condition representing or corresponding to the binary number 11; that is, the decimal number 3. In practice, with the particular counter that was employed in the practice of this invention, a 0-signal was represented by a 0 voltage applied to a terminal and a 1-signal was represented by +5 volts applied to a jam terminal. The counter was then initialized by applying a 1-signal to an enable terminal 164, while a 1-signal was on the input terminal 160.

The total count registered and stored in each of the counters 148–151 is represented by the signals on their corresponding output terminals 1–4, in the binary system. Thus, if a 1-signal appears at output terminals 1 and 3 of the counter 148, and a zero signal at output terminals 2 and 4, an output count of 0101 is indicated on a binary basis, that is, a 5 on a decimal basis.

Counters of the type employed are of a conventional design which employ transistors, diodes, or magnetic cores as memory elements. Signals fed into such counters change states of such memory elements, and the states of the elements constitute manifestations of the numbers stored in the counters. Such numbers may be changed and may be read out of the counters in conventional manner.

The display device 30 includes a display unit 166 having four seven-segment incandescent filament optical display devices 168–171, connected to the display counter 136 through a decoder/driver device 172, including decoder driver units 173–176, to display numbers representing a count stored in the display counters 148–151.

The four decoder/driver units 173–176 receive the binary digital signal from the output terminals of the decade counters 148–151, respectively, and then supply signals to corresponding segments of the seven segment incandescent lamps to produce displays in terms of decimal digits. Each of these decoder/drivers is connected to the display control terminal 178 in order to permit energization or de-energization of the incandescent lamps as required.

A suitable display device for use for this purpose includes a type 93L10MSI BCD decade counter, a type 9317 decoder/driver manufactured by Fairchild Camera and Instrument Corporation and sold by its Semiconductor Division and a suitable seven segment display device manufactured by Readouts, Inc.

A blanking signal is supplied from the output of the lockout unit 132 through the display control terminal 178 to the decoder/driver unit 172 to enable it to actuate the display unit 166 to provide a visible display only when the temperature of the patient lies within a selected range which, in this case, includes a suitable clinical range such as one that extends from 94° F. to 106° F., this being the range commonly of interest with human patients. Note that in the practice of the invention in the embodiments described herein the range selected for display is somewhat larger than the clinical range and includes the clinical range.

The timer unit 128 not only includes a timer counter 130 but also a clock pulse source 180, an AND gate 182, and a decoder 184. The timer decoder 184 and the timer counter 130 together constitute a modulus 158500 counter.

The lockout unit 132 includes two decoders, namely a display control decoder 186 and a subtractor decoder 188. Decoder 186 controls the decoder/driver unit 172 to permit display of a counter only if it lies within the selected range. Subtractor decoder 188 suppresses some of the pulses that otherwise would be counted, so that, in effect, the pulses arriving in a predetermined sampling interval provide a count that is the product of a constant times the burst rate (e.g., 0.1585 × B.R.) which is to be added to a constant value count corresponding to the intercept of the frequency vs. temperature characteristic curve to produce a correct measurement.

Various required operations are accomplished with the aid of LATCH units, which produce a positive output upon receipt of a set signal and a negative output upon receipt of a reset signal, various gates, a univibrator, and the decoder units, as well as the counters.

In the operation of this system, pulses supplied to the input terminal of the logic circuitry by way of line 106 from the lockon network 26 are counted during a predetermined time interval and applied to the previously initialized display counter 136. The count is decoded in the decoder driver unit 172 and, if the count lies within the range of interest, the count is displayed on the display unit 166.

In the particular form of the invention illustrated in FIG. 8, the temperature value that corresponds to the intercept of the temperature pulse rate curve with the zero frequency axis of the graph is not fed in directly. Instead, a larger number is stored in the display counter 136 and then, by means of the blocking counter 134, an appropriate number of the pulses arriving during the predetermined time interval are suppressed, that is, not counted. The effect, however, is the same as introducing into the display counter 136 a count corresponding to the intercept of the temperature versus pulse rate curve. In accordance with this invention, in effect, a predetermined count corresponding to the intercept is stored in the display counter 136, and a count is added that occurs during a predetermined sampling interval corresponding to the slope (pulses per second per degree F.) of the temperature-pulse rate curve in the linear range.

A special connection in the second display device 169 is energized to permit display of a decimal point following the digit display by that device. The display devices 168–171 are all provided with what is known as a ripple blanking output terminal so as to prevent the display of leading zeroes. In other words, with four display lamps, if the temperature to be indicated is 98.0, the count in the fourth counter 151 is zero, but a zero will not be displayed on the corresponding lamp 171. Instead, the lamp will be blank when energized for display.

The receiver 14, including the pulse rate measuring and indicating system, is operated by closure of a manually operated push button switch 122. As illustrated, this switch has two sets of normally open contacts 190, for applying power to the entire display device, and 192 for resetting components to their initial conditions and for initiating the automatic operation of the pulse rate measuring and indicating device. In practice only one pair of contacts is needed. In the particular form of the invention, the push button switch 122 is maintained closed until after the observation of the display is completed.

When the contacts 190 are closed, circuits are completed for energizing the radio frequency amplifier 81, the demodulator 84, and the pulse squaring circuit 86 (FIG. 6). After a short time, just a fraction of a second if bursts of the kind mentioned are being received, signals appear in the output of the demodulator and are passed through the pulse shaping circuit to the phase lock unit 26 (FIG. 7). After a short interval, the phase lock circuit commences its sweep, searching for a train of pulses of some frequency within its range. When pulses of this frequency are encountered, a train of square pulses appears at the output of the pulse squarer. For a brief interval of time, pulses appear at the output of the phase lock unit at a diminishing frequency, producing what is known as a "chirp" signal. These pulses, however, are occurring during an interval when counting is precluded by virtue of the action of the univibrator. When the phase lock unit locks onto, or is captured by a train of pulses from the demodulator 84 that are occurring at a substantially regular interval, square waves are produced at the output 106 of the phase lock unit 26 at a frequency corresponding to the burst rate. If the phase lock unit does not lock onto such a series of regularly recurring pulses, the phase lock unit continues to sweep to its lower frequency limit and produces pulses at a very low rate corresponding to a temperature, such as 80°F., which is far below the clinical range.

When the push button switch 122 is closed, a transient electric trigger signal is generated and is applied to a univibrator or single-shot multivibrator 194, the trigger pulse actuating the univibrator 194 to generate a positive reset pulse Q on line 196 and also a negative reset pulse $\bar{Q}$ on line 198 of approximately one second duration. Although the pulses Q and $\bar{Q}$ are referred to herein as resetting pulses, in fact they also perform other initializing and enabling functions in addition to the function of resetting. For purposes of initializing certain counters the negative pulse $\bar{Q}$ terminates shortly after the positive pulse Q.

The two reset pulses Q and $\bar{Q}$ exit concurrently for a period of time sufficient to cause the components of the pulse rate measuring and indicating device 28, 30, such as the various counters, decoders and LATCH units, to be "reset" to their initial condition so as to prepare them for operation to produce an accurate temperature reading. Thereafter, the operations of counting and indication are carried out automatically and, if a temperature within the clinical range actuates the receiver, a temperature-indicating count is displayed and is maintained in visible form until the push button 122 is released.

More particularly, the pulse rate measuring and indicating device includes a count-starting LATCH unit 200, a count-stopping LATCH unit 202, a count initiator LATCH unit 204, and a count gating unit 206. The timer unit 128, which operates to produce a 1-signal at its output only when a count of 158,500 has accumulated in it, includes the clock pulse source 180 which supplies square pulses to the six-stage counter 130 at a rate of 1,000,000 pps when the AND gate 182 is enabled by the starting LATCH 200. The six-stage counter 130 comprises a series of six decade counters 138–143, with the clock pulses being supplied to the input of the first decade counter 138. The outputs of each of the first five decade counters 138–142...are connected to the inputs of the next succeeding decade counters 139–143, respectively. When properly zeroed and then suitably energized by the start LATCH 200, the six-stage counter 130 counts clock pulses from the clock pulse source 180. When the count in any stage reaches 10, a carry pulse is applied to the input of the next stage, so that in the next stage there is a count of the number of times that a count of 10 has been reached in the preceding stage. Each of the decade counters, except the counter 138, has an output terminal that is used to produce a 1-signal only when the count in that stage has reached a selected predetermined value.

When a total count of 158,500 pulses has been registered, the first significant digit (1), will be recorded at output terminal number 1 of the sixth counter 143, the next most significant digit (5) will be recorded by a 1-signal at output terminal 5 of the fifth counter 142, the next most significant digit (8) will be represented by a 1-signal at the output terminal 8 of the fourth decade counter 141, the next most significant digit (5) will be represented by a 1-signal at the output terminal 5 of the third counter 140 and the next significant figures (0 and 0) will be represented by a 1-signal at the terminals of the second and first counters 139 and 138, respectively. The terminal 0 of the first counter 138 need not be used since counter 138 reads 0 when the other counters reach their assigned values of 0, 5, 8, 5, and 1 respectively.

In order to detect when a total count of 158,500 has been reached, the appropriate one-digit output terminals of each of the counters 138–143 are connected to respective inputs of decoder 184. Thus, terminal number 1 of the sixth decade counter 143 is connected to one input leg of decoder 184, the five-digit output terminal 5 of the fifth decade counter 142 is connected to a second input leg the eight-digit output terminal 8 of the fourth decade counter 141 is connected to a third input leg, the five-digit output terminal 5 of the third decade counter 140 is connected to a fourth input leg, and the zero-digit output terminal 9 of the second decade counter 139 is connected to a fifth input leg of the AND gate that acts as the decoder 184. As indicated above, the first counter 138 need not be connected. With this arrangement, a positive signal appears at the output of the decoder 184 only when a count of 158,500 pulses is reached. Thus, once the counting operation of the counter 130 is initiated, the decoder 184 has a 0-signal at its output until a total time of 0.158500 sec. has elapsed.

The four decade counters 148–151 of the display counter 136 receive at input 160 the pulses to be counted. The output of each of the decade counters 148–150 is connected to the input of the next succeeding decade counter 149–151 respectively. When suitably operated, this counter has a count stored in it that is representative of the temperature.

Two decoders 186 and 188 are associated with the lockout counter 134. Decoder 188 produces a 1-signal at its output only when the count is 88, and decoder 186 produces a 1-signal only when the count lies between 240 and 499 inclusive.

By way of illustration of the operation of the pulse rate measuring and indicating device, assume that bursts of carrier waves are transmitted to the receiver unit 14 at a burst rate of 2,100 pps. This rate corresponds to a temperature of 101.6°F. of the patient.

If the receiver unit is within operating range of the receiver, when the system is operating the pulse squarer 86 will produce rectangular pulses at its output at the same rate of 2,100 pps and these pulses will be supplied to the pulse rate measuring and indicating system of FIG. 8. When it is desired to measure and indicate the temperature, the push button switch 122 is closed and held closed until after the measurement has been made. At the moment of closing the push button switch, all the parts of the receiver unit that require power are energized by closing the normally open contacts 190. Immediately thereafter, normally open contacts 192 close, generating an electrical pulse which is applied at the input of the univibrator 194, producing a reset 1-signal Q and a complementary reset 0-signal $\bar{Q}$, both about 1-second duration at the outputs 196 and 198 respectively. Immediately the receiver commences operation, and in less than 1 second rectangular pulses are produced at the transmitted burst frequency at the output 92 of the pulse squarer 86.

The initiation of the reset pulses Q and $\bar{Q}$ performs a number of operations, as follows:

1. A positive reset pulse is applied to the reset terminals 156 and 208–212 of the decade counters 138–142 of the timer counter 130, thereby setting the timer counter to its zero condition. It is not actually necessary to reset the first counter 138, since an error in the sixth significant digit is immaterial in this particular use of the invention.
2. A positive reset pulse is applied by way of line 196 to the reset terminals 214–216 of the decade counters 144–146 of the lockout counter 134, thereby setting the lockout counter to its zero condition.
3. Starting LATCH unit 200 is reset by the positive reset pulse on line 196, establishing a 0-signal at its output 218. As a result, the timer AND gate 182 at the input of the timer counter 130 is closed, preventing the feeding of pulses from the clock pulse source to this counter until the LATCH unit 200 is set.
4. A positive reset pulse applied to the stop LATCH unit 202 by way of line 196 generates a 0-signal at its output 220 which is applied to the input of the NOR gate 222 to produce a 1-signal in the output of the NOR gate except when a 1-signal is being applied to the input terminal 106.
5. A positive reset pulse is applied to the lockout LATCH unit 204 thereby producing a 0-signal at its output 224. This 0-signal disables AND gate 226, preventing flow of pulses to the display counter 136 until the LATCH unit 204 is set.
6. A positive reset signal is applied by way of line 196 to the NOR gate 228 in the counter gate 206.
7. At the same time, a negative reset signal is applied by way of line 198, which is a parallel-enable line, to set the initial reading of the display counter 136 to a condition corresponding to the intercept temperature of 68.3° F. or alternatively, some higher temperature. As shown, the counter 136 is initialized with a count of 770.

The various parts of the pulse rate measuring and indicating device of FIG. 8 remain in the states mentioned above until the termination of the 1-second setting pulse supplied from the output of the univibrator, 194. When the setting pulses from the univibrator terminate at the end of 1 second, the following actions occur:

1. The setting pulse is removed from the reset terminals of the timer counters 138–143, leaving this counter in a 0 state ready to accumulate a count of pulses applied to its input 154.
2. The setting pulse is removed from the reset terminals 214–216 of the lockout counters 144–146, leaving the lockout counter 134 in a 0 state ready to accumulate a count of pulses applied to its input 230.
3. The setting pulse is removed from the NOR gate 228, thus applying a 1-signal to the counter 136. After about a 0.5$\mu$ sec delay, the setting pulse is removed from the parallel enable line 198, thus storing a count of 770 in the four-stage counter 136 and preparing this counter to add the number of pulses received by it to the number 770. This particular method of reading in the initial count is necessitated by the characteristics of the particular counter employed, which is a Model No. MSI93L10 unit manufactured by Fairchild Semiconductor.
4. When the setting pulse is removed from the LATCH units 200, 202, and 204, they remain in the conditions in which they have been reset until a subsequent time when a setting pulse is applied to them.

These three set pulses, as will be seen, are applied at three different times.

At the end of the foregoing operation, the arrival of the next burst pulse from the receiver produces a pulse at the output of the input NOR gate 222. For convenience, we will call this pulse the first action pulse. This pulse travels to different units by three different paths:

1. The first action pulse sets the LATCH unit 200 by way of line 232, thus enabling AND gate 154 at the input of the timer counter 130, causing this counter to count and register pulses thereafter arriving at its input from the clock pulse source 180.

The first action pulse and subsequent pulses appearing at the output of the NOR gate 222 are fed to the lock-out counter 134 by way of line 230, causing this counter to proceed to count.

By virtue of the action of the LATCH unit 204 while the first 87 pulses are arriving, AND gate 226 remains closed, preventing the feeding of pulses to the display counter 136. But when a count of 88 is reached, the decoder 188 feeds a setting pulse to the LATCH unit 204, enabling the gate 226 of the count gating unit 206. The incoming pulse corresponding to count 88 is fed by way of line 234, AND gate 226, NOR gate 228 and line 16 counted by the display counter 136.

Additional pulses applied to the lockout counter 134 continue to accumulate therein for purposes to be explained hereinafter. But since 87 pulses were not counted, the total number of pulses that have accumulated at any time equals 683 +NT where NT is the number of pulses that have arrived at the output 234 of the input gate 222 up to that time. Thus, the LATCH unit 204 acts as a subtractor to suppress a number of pulses equal to 770–683, the excess of the count initially stored in the display counter above the intercept level of 683.

It will be appreciated that the subtraction function performed by the LATCH unit 204 is not essential.

The subtractor which includes the decoder 188 and the LATCH unit 204 could be removed and the output counter 136 initialized with a count of 683. In effect, the initializing of the display counter 136 taken together with the action of the subtractor 188, 204 jointly establish the intercept value which serves as a base upon which to add pulse counts to correctly indicate temperature in the range of interest.

The lockout unit 132, however, serves two additional important functions. First of all, it suppresses the operation of the display counter during the period while the count is accumulating, thus avoiding the annoyance of watching a lengthy series of changing numbers. This suppression is accomplished by means of an 0-signal at the output of the decoder 186.

Secondly, the lockout unit 132 prevents the display of any temperature indication at all if the count is completely outside the range of interest. In particular, it prevents a display of a pseudo-temperature if the receiver unit is located so far from the transmitter that the strength of the received signals is too low to bring about synchronous operation of the phase lock unit 26. Thus, for example, if the temperature corresponding to the minimum frequency of operation of the phase lock unit is 80°F, the lockout unit will be set to operate the output decoder/driver 172 of the display unit only if a temperature indication is reached that is somewhat above 80° and somewhat below the minimum clinical temperature of 94°F.

3. While counting is taking place in the display counter 136, the decoder 186 applies a 0-signal to the decoder/driver units 172, holding the display unit 166 in its off condition and preventing the energization of the display indicators 168–171. The decoder/drivers and hence the indicators remain in this off condition until and unless the total number of pulses counted by the three-stage counter 134 reaches a count of 240. This corresponds to a temperature of 92.3 which is below the clinical range of interest. When a count of 240 is reached decoder 186 operates to activate the decoder/driver units to their on condition, thereby energizing the indicators 168–171. While so energized, the indicators display a number representing 683 plus the number of pulses that have been received. This action continues until the end of the time interval 0.15850 sec.

When the total number of pulses from the clock pulse source 180 counted by the six-stage counter 130 has reached 158,500, the decoder 184 applies by way of line 236 a setting signal to the stop LATCH 202, thereby supplying a 1-signal to the input NOR gate 222, disabling this gate and cutting off the continual flow of pulses to the remainder of the pulse counting measuring and indicating device. At that time counting is discontinued and the temperature corresponding to the number of input pulses received during the time interval defined by the count (e.g., 101.5°F.) remains displayed on the indicator until the push button switch 122 is released.

Figure 9:
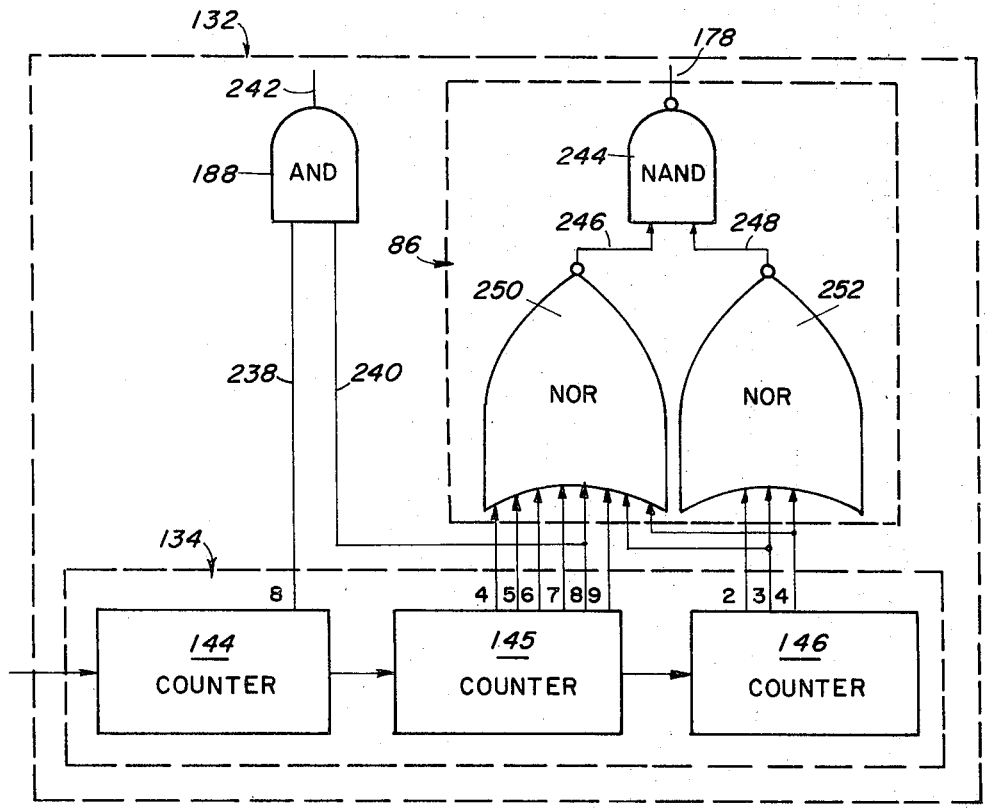
FIG. 9 is a block diagram of the lock-on counter unit of FIG. 8.

The lockout unit 132 of FIG. 8 is illustrated in more detail in FIG. 9. As indicated there, the decoder 188 has two input terminals, one connected by way of line 238 to the output terminal 8 of the counter first stage 144 and another by way of line 240 to the output terminal 8 of the second stage 145 of the lockout counter 134. Thus, the decoder 188 applies a 1-signal to the setting leg of the input control LATCH 204 by way of line 242 whenever a count of 88 is reached in these two stages, irrespective of what is occurring in the third stage 146. In operation, once the counting LATCH 204 has been set, application of addition 1-signals to the setting leg by way of line 242 have no effect, since no signal is applied to the resetting leg from line 196 of this latch at any time while the measurement and display are transpiring.

The lockout decoder 186 includes an output NAND gate 244 that has two input legs 246 and 248 that are supplied with signals from the outputs of two NOR gates 250 and 252. The decimal digits represented by 1-signals at output terminals of the various states of the counter 134 are indicated in FIG. 9. These digits correspond to the symbols referring to the output terminals, since these stages are decimal counters. Terminals not used for this purpose are not shown in FIG. 9. The input legs of NOR gate 250 are connected to output terminals 4, 5, 6, 7, 8, and 9 of the second stage 145 of the lockout counter. Other input legs of the NOR gate 250 are connected to the output terminals 3 and 4 of the third stage 146 of the lockout counter. Input legs of the other NOR gate 252 are connected to the output terminals 2, 3, and 4 of the third stage 146 of the lockout counter. With this arrangement a 1-signal appears at the output 178 of the decoder 186 only after the count stored in the lockout counter 134 has reached a value of 240 and remains there until the count stored in the lockout counter 134 reaches 500. In practice the count 240 is reached at a point corresponding to a temperature reading of 92.3°F., which is just below the clinical range of interest, and the count of 500 corresponds to a temperature reading of 118.3 which is far above the clinical range and hence is never reached in normal usage. Accordingly, the decoder 186 turns on the decoder/driver 172 when a temperature reading of 92.3°F. is reached. Assuming that the temperature of the patient is in excess of this value, counting continues while the display remains visible and counting is discontinued when the proper number of pulses, in this case 333, corresponding to the temperature reading, has been reached. At this count the operation of the modulus 158,500 timer unit 128 applies a 1-signal to the stop LATCH 202 which in turn applies a 1-signal to the input gate 222, cutting off the flow of pulses into the pulse rate measuring and indicating system. As a result, a count of 1016 corresponding to a temperature of 101.6 remains visible on the display unit 166 indefinitely, until the push button 122 is released.

Figure 10:
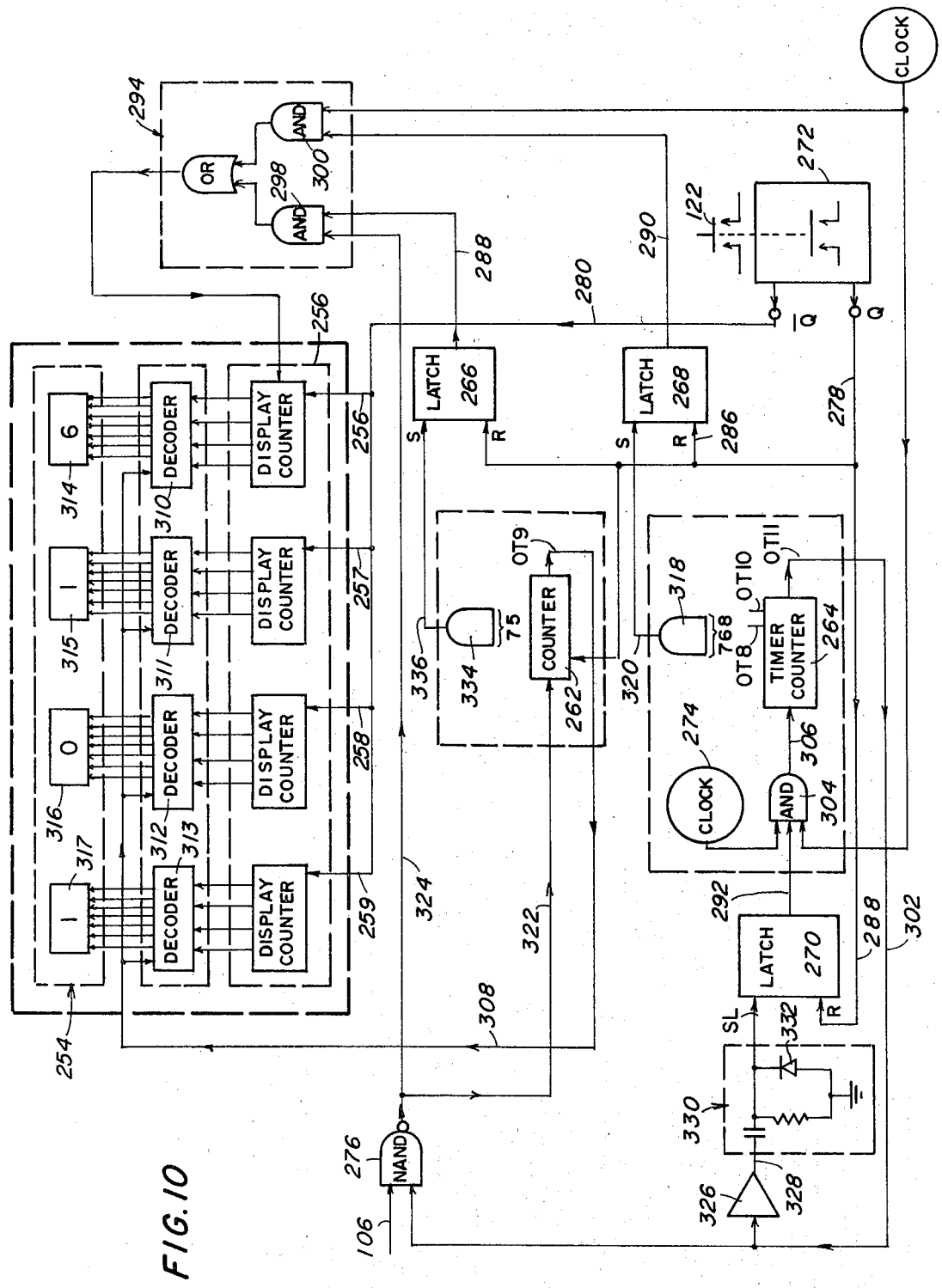
FIG. 10 is a block diagram of a second embodiment of a logic and display unit for use in the receiver of FIG. 1.

In FIG. 10 there is illustrated another embodiment of the invention. In this form of the invention a display unit 254 is employed which is similar to that previously described except that it does not employ jam terminals. Instead it has four reset terminals, 256–259, which are employed for initially storing a 0 count in the display counter 260. This embodiment of the invention employs a 9-stage lockout counter 262, an 11-stage timer counter 264, three LATCH units 266, 268 and 270, a univibrator 272, various other logic units, and a clock pulse source 274. For reasons which will become clear hereinafter, the clock pulse source 274 of this embodiment of the invention is designed to produce pulses at its output at a frequency of 6461 pps. The timer counter 264 is of the binary type producing a 1 at its output terminal OT-11 only while it registers a count between 1024 and 2047 inclusive. The lockout counter 262 is also a binary counter producing a 1 on its output terminal OT9 only when it reaches a count of 256.

In this particular form of the invention, after the pulse rate measuring and indicating device is reset to its initial condition, 768 pulses from the clock pulse source 274 are supplied to the display counter 260. The input pulses from the pulse squarer are supplied to the input terminal 106 of the NAND circuit 276. The first 75 pulses are not counted thus simulating the effect of introducing a count of 683 to the display counter 260 initially. Additional input pulses are fed from the input 106 to the display counter 260 for a period of 0.1585 second.

When the push button switch 122 is closed, the various electronic units including the logic units are energized by a supply of suitable power. As before, the closing of the push button switch actuates the univibrator 272 to produce on line 278 a positive unit reset pulse Q of about 1 second duration at its positive output terminal and a negative unit reset pulse $\overline{Q}$ may terminate at the same time as the positive unit pulse Q.

The positive reset pulse Q is applied to the reset terminal RT-11 of the timer counter 264 and to the reset terminal RT-9 of the lockout counter 262. The negative unit pulse $\overline{Q}$ is applied to the reset terminals of the display counter 260 in order to reset these counters by storing the value 0 in them.

At the same time, the reset unit pulse Q is applied to reset terminals 282, 284, and 286 of the LATCH units 266, 268 and 270 to reset them to their initial conditions for commencing operation. Resetting of the LATCH 266 produces a 0-signal at its positive output terminal 288. Resetting of LATCH unit 268 produces a 1-signal at its negative output terminal 290. Resetting of LATCH unit 270 produces a 1-output signal at its negative output terminal 292.

The counting gate unit 294 of this embodiment of the invention comprises an OR gate 296 that is supplied at its input legs with signals from the outputs of two AND gates 298 and 300.

The NAND gate 276 at the input of the pulse rate measuring and indicating device is supplied with the incoming pulses on input 106 and is enabled by a signal applied to its other input leg by way of line 302 from the output terminal OT-11 of the timer counter 264. Signals from the clock pulse source and the output signals from adder LATCH 268 are supplied to input legs of AND gate 300. Signals appearing at the output of the NAND gate 276 and signals from subtractor LATCH 288 are applied to input legs of AND gate 298.

The clock pulses and a signal from the output of the time LATCH 270 are applied to input legs of an AND gate 304 at the input terminal 306 of the timer counter 264.

Accordingly, when operation is initiated by pressing the push button 122, the following states are developed in various parts of the pulse measuring and indicating system:

1. The zeroing of the lockout counter 262 applies a 0-signal from the output terminal OT-9 to the display control line 308, of the display unit 254, disabling the decoder/driver units 310–313, precluding a display of any information on the seven-signal display elements 314–317 until a 1-signal is later applied to the display control terminal, 308.

2. A 0-signal developed at the out put terminal OT-11 of the timer counter 264 disables the NAND gate 276, temporarily precluding the transmission of input signals.

3. The 0-signal developed at the output terminal 288 of the subtractor LATCH unit 266 disables AND gate 298, precluding the transmission of input pulses through this AND gate even if they are being transmitted through the input NAND gate 276.

4. The 1-signal developed at the output of the timer LATCH unit 270 enables AND gate 304, permitting the feeding of clock pulses from source 274 to the input terminal 306 of the timer counter 264.

5. The 1-signal developed at the output of the adder LATCH 268 enables AND gate 300 thereby permitting the flow of pulses from the clock pulse source 274 through the AND gate.

While the reset pulses Q and $\overline{Q}$ are applied, counting cannot proceed. After the 1-second period, setting pulses are removed from the three counters, permitting them to proceed to count.

As pulses from the clock pulse source 274 continue to flow through the AND gate 300, they increment the count stored in the display counter 260. At the same time, clock pulses are supplied through the AND gate 304 to the input terminal 306, incrementing the count stored in the timer counter 264. When 768 clock pulses have been supplied to the timer counter 264, a 1-signal is developed at the output of a decoder 318, applying a setting signal on line 320, to the adder LATCH 268, developing a 0-signal at its negative output terminal 290. This 0-signal terminates the flow of pulses through the AND gate 300. At this time, therefore, a count of 768 is stored in the display counter 260. The period of time during which the AND gate 300 counts is 0.118 sec., as determined by the rate of clock 274.

As the counting of clock pulses continues, the count accumulated in the timer counter 264 continues to increase until a count of 1024 is reached. At this point a 1-signal appears at the output terminal OT-11. This signal is applied to the input NAND gates 276, opening this gate and permitting input pulses to flow through line 322 to lockout counter 262 and also through line 324 to an input leg of AND gate 298. They flow no farther, however, because of the 0-signal from the subtractor LATCH unit 266 on the other leg 288 of the AND gate 298. When the 1-signal is developed at the output terminal OT-11 of counter 264, it is fed by way of line 302 to an inverter 326, where a negative-going signal is developed on line 328. This negative-going signal does not affect the LATCH unit 270 because of the action of the fast-acting differentiating circuit 330 and the diode 332. As the term is used here, a fast differentiating circuit is one in which the time constant is less than about 10% of the pulse width.

After 75 pulses have been fed into the lockout counter 262, the decoder 334 produces a 1-signal at its output 336, setting the subtractor LATCH 266 and developing a 1-signal at its output terminal 288. At this time, the AND gate 298 is opened permitting the flow of input pulses through the AND gate 298, through the OR gate 296, and to the display counter 260 where the pulses are counted.

Clock pulses continue to be counted in the timer counter 264 while input pulses are being counted in the display counter 260. When the total number of pulses fed into the timer counter reaches the count of 2048, a 0-signal appears at its output terminal OT-11 of timer counter 264. This signal shuts off the flow of input pulses through the input NAND gate 276. It is to be noted that the time during which a 1-signal appears at the output OT-11 is the time corresponding to the counting of 1024 pulses from the clock pulse source. Because of the fact that the clock pulse source 274 is operating at a rate of 6461 pps, the NAND gate 276 is open for a period of 0.1585 sec. Accordingly, the total number of pulses registered by the display counter 260 is a correct indication of the temperature to which the frequency or rate of the incoming pulses corresponds.

It is to be noted that the subtraction operation performed by the LATCH unit 266 is similar to that previously described. In other words, the subtraction is performed by precluding the counting of an appropriate number of incoming pulses.

When a 0-signal appears at the output terminal OT-11 of counter 264 a positive-going pulse is developed at the output of the inverter 326. Consequently a positive spike appears at the output of the differentiator circuit 330 and this positive output signal sets the timer LATCH 270, producing a 0-signal at its output and shutting off the timer gate 304. In other words, after pulses have been counted for a period of 0.1585 sec. all counting is discontinued.

The combined adding and subtracting arrangement for taking the value of the intercept into account is not required for the practice of this invention. The combined addition and subtraction action was introduced into the foregoing embodiments of the invention primarily as a matter of convenience to take into account limitations of various low priced integrated circuits that were available on the market at the time various embodiments of the invention were made. However, a combined adding and subtracting feature also lends flexibility for adapting the equipment for use with different temperature scales.

Figure 11:
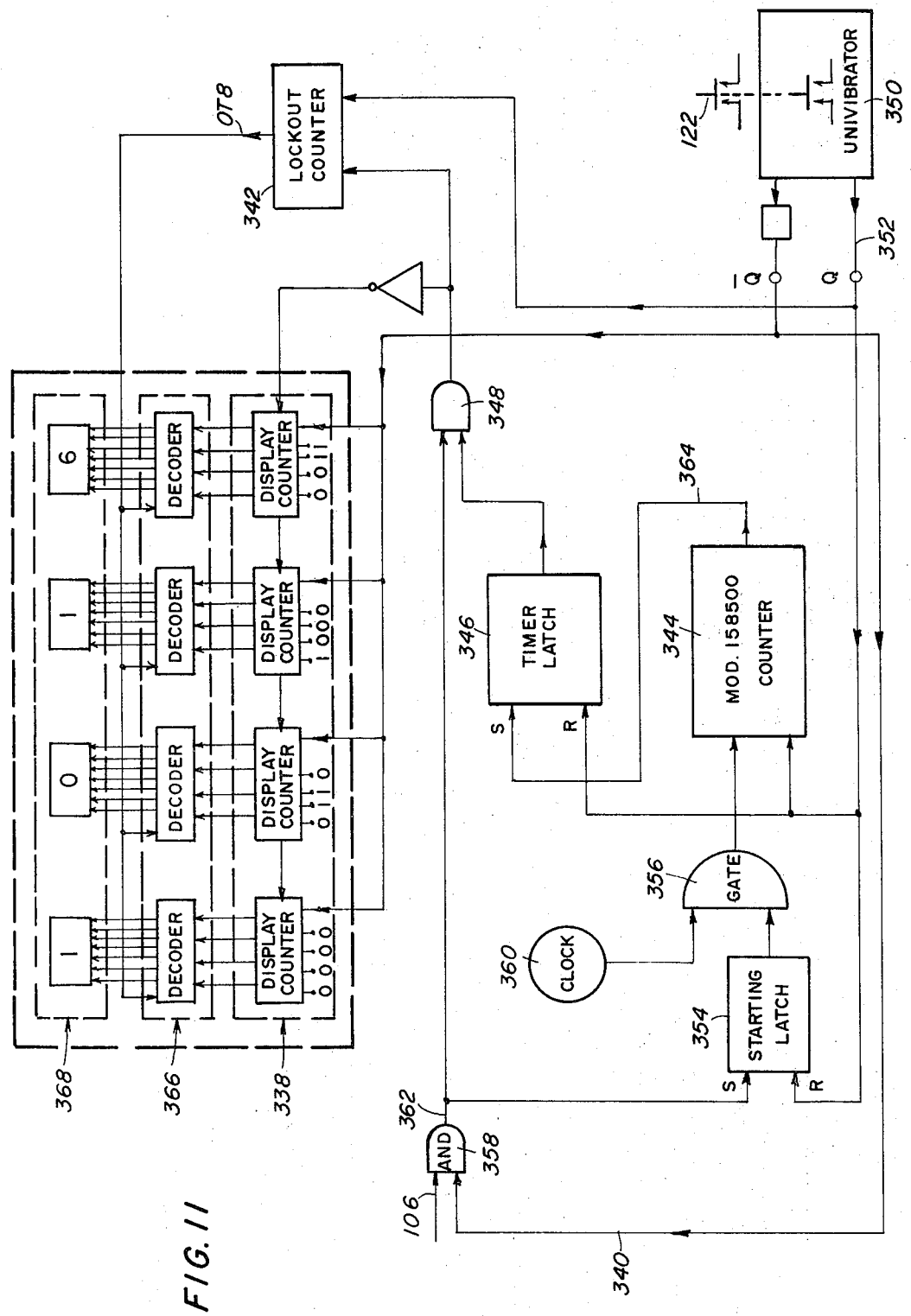
FIG. 11 is a block diagram of a third embodiment of a logic and display unit for use in the receiver of FIG. 1.

A third embodiment of the invention, illustrated in FIG. 11, employs a display unit of the type heretofore described in connection with FIG. 8. This display unit, however, is so designed that a count of 683 corresponding to the intercept is stored in the display counter 338 initially by applying a negative pulse $\bar{Q}$ to enable terminals by way of line 340.

A scale-of-eight binary lockout counter 342 is provided to change the output signal at its output terminal OT-8 from a 0 to a 1 when the count of 256 is reached and then to change the output signal from 1 to 0 when the count of 512 is reached.

Figure 13:
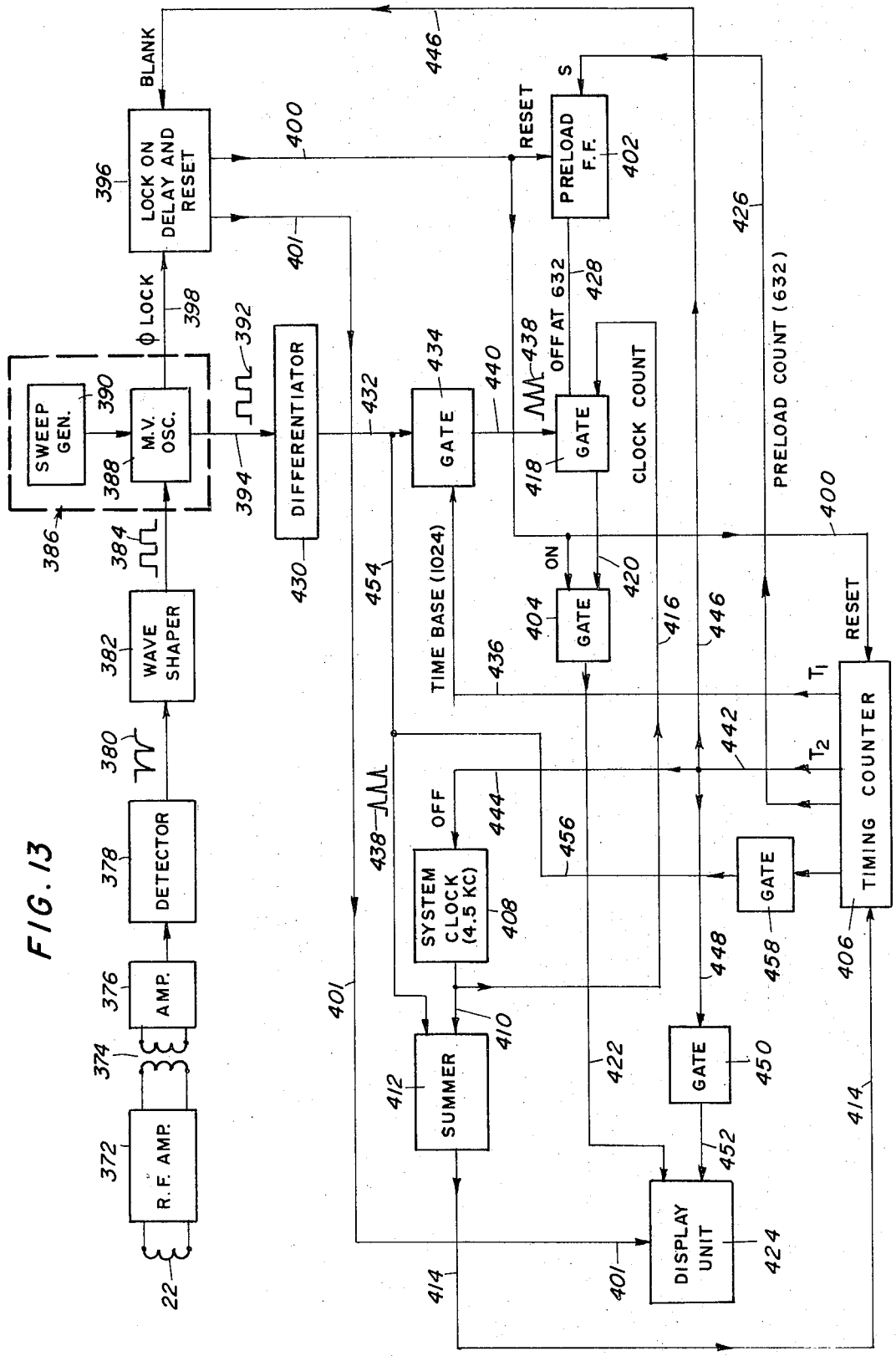
FIG. 13 is a block diagram of an improved receiver, logic and display circuit for use in the system of FIG. 1.

A timer unit 344 in the form of a modulus 158,500 counter is employed, which operates like the timer unit of FIG. 13 to operate a timer LATCH unit 346 to open the AND gate 348 for a period B of 0.158500 seconds.

Other parts of this unit are employed to effect the required initialization of the count in the display counter 338 and then, without any substraction as in the previously-described units, to proceed to count all of the pulses that arrive at the input terminal 106 during the time interval B.

In operation, the negative 1-second unit pulse $\bar{Q}$ from a univibrator 350 is applied to the parallel enable line 340 to initialize the display counter 338 to the intercept value. At the same time, the positive 1-second unit pulse Q developed in the output of the univibrator on line 352 resets the lockout counter 342 and the timer unit 344 to 0. Simultaneously, the positive 1-second pulse on line 352 resets the timer LATCH 346 and the starting LATCH unit 354. While reset, the timer LATCH 346 applies a 1-signal to the counting gate 348 and the starting LATCH unit 354 applies to a 0-signal to a timer gate 356.

The 1-second negative pulse $\bar{Q}$ is also applied to the input AND gate 358 by way of line 340, and during this time none of the signal pulses arriving at the input 106 flow into the system. At the same time, none of the clock pulses from the clock pulse source 360 are fed to the timer unit 344.

At the end of the 1-second interval established by the univibrator, the input AND gate 358 opens. The first pulse appearing at the output 362 of the AND gate operates the starting LATCH unit 354 to open the timer gate 356, starting the count of clock pulses in the timer unit. Also, at the time that the input AND gate 358 opens, signal pulses begin to flow through the AND gate 348 and to the display counter 338. The process of counting continues until a 1-signal appears at the output 364 of the timer unit 344, setting the timer LATCH unit 346 and closing the counter gate 348.

When the total number of pulses that have entered the lockout counter 342 has reached a count of 256, a 1-signal appears at its output OT8, thereby energizing the decoder/driver units 366 of the display unit 368 to illuminate the appropriate filaments of the display lamps, thereby providing a readout of the monitored temperature.

Although the foregoing embodiments of the present invention perform adequately to produce a display readout of a monitored parameter, several problems have been encountered in their use. First of all, the receiver portion of those systems responds too slowly to received signals, for it is necessary to wait for stabilization of the various receiver networks before a readout is produced, and this is too slow for practical use. In addition, the embodiments described above utilize circuitry that is very complex, and thus are excessively costly to build. Perhaps the major difficulty, however, is the inability of these systems to provide compensation for the non-linear frequency versus temperature characteristic of the sensor-transmitter. These difficulties dictated the development of a fourth embodiment of the invention, therefore, which provides a simplified circuit capable of responding very rapidly to the energization of the system to produce a readout display. In this device the receiver portion is capable of producing an output in 0.08 seconds, even in the presence of a weak signal, and of providing a completed readout display in 0.4 seconds. Further, the improved system is designed to compensate for the non-linearity of the output characteristic from the transmitter, thereby improving the accuracy of the system throughout its range.

Figure 12:
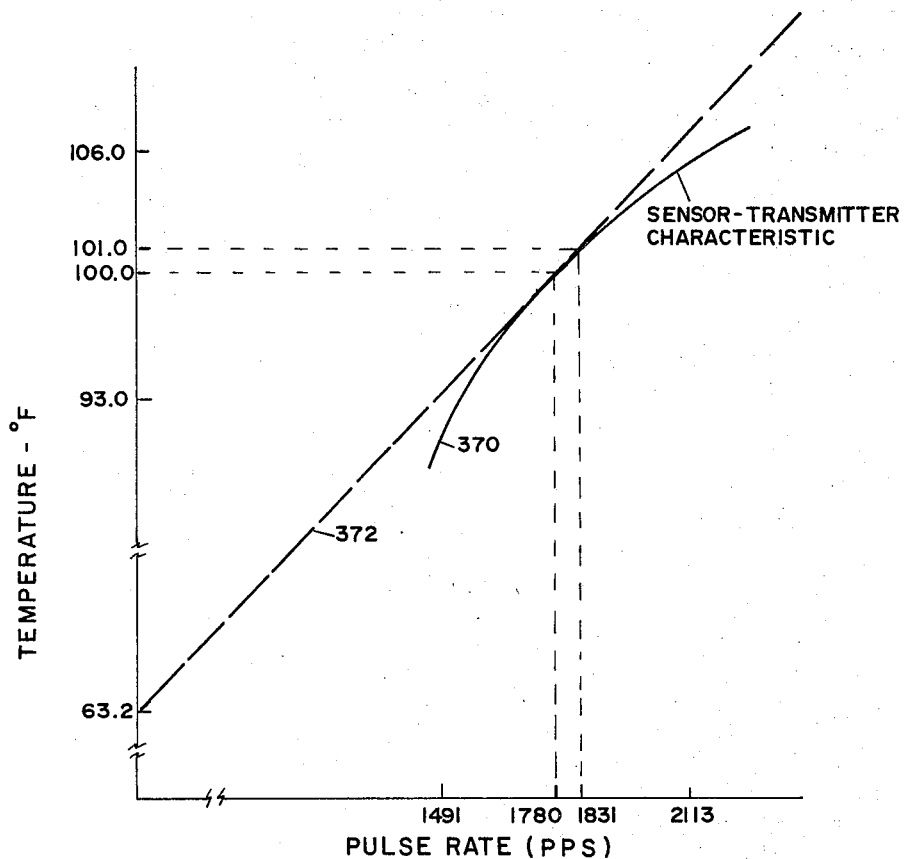
FIG. 12 is a graphical illustration of the temperature vs. frequency characteristic of the transmitter.

FIG. 12 illustrates at 370 a typical sensor-transmitter characteristic, illustrating the fact that at higher temperatures, the transmitter produces a greater increase in the number of pulses per degree of temperature increase than is true at the lower temperatures within the range of interest in the present system. Thus, at temperatures in the neighborhood of 106°F. the slope of the characteristic curve 370 is approximately 54 pulses per second per degree Fahrenheit, while the lower end of the range, at approximately 93°F., the slope is approximately 48 pps/°F. Thus, as the temperature increases from the lower end of the range to the upper end, it is necessary to have a progressively shorter time duration in which to count received pulses, or else the pulse rate must be slowed, if accurate data is to be obtained. Since it is not practical in the receiver to reduce the number of pulses received, and since the subtraction of a varying number of pulses at each temperature involves a highly complex circuit, in the present device this problem is overcome by utilizing the increased rate of received pulses to automatically reduce the amount of time during which the received pulses are counted, thereby imposing on the receiver a response characteristic which compensates for the non-linearity of the transmitter.

As shown in FIG. 12, if the average slope of the characteristic slope 370 is extrapolated to the zero pulse rate axis, as indicated by a line 372 tangent to the midpoint of curve 370, the line will intersect the zero axis at approximately 63.2°. In order to convert the number of received pulses to an accurate representation of the measured parameter, a counter is provided in the receiver unit logic circuit for producing during a first time period $T_1$ a number of pulses representing this intersect point; in this case 632 pulses. These pulses are then applied to a display unit accumulator. During a second time period $T_2$ in the logic circuit, the pulse counter then receives data pulses representing the measured parameter, the number of pulses received in a fixed time period representing a temperature in accordance with the slope of line 372, the non-linearity of curve 370, with the number of pulses accumulated during this second time period being added to the original 632 in the display counter to produce a total number of pulses representative of the measured parameter. Thus, if the measured temperature 101.0°F., a total of 1010 pulses must be accumulated; therefore, during the first time period of the logic circuit, 632 pulses are accumulated and during the second time period 378 pulses are accumulated.

If, for example, the sensor-transmitter produces data at a rate of 1,831 pulses per second at 101°, it will be seen that the requisite 378 pulses will be received by the logic circuit in 0.203 second. At 93° only 298 additional pulses are to be received, and at a pulse rate of 1,491 pps, this will require 0.200 second. Finally, at 106°, approximately 0.204 second will be required to acquire the needed number of pulses. Thus, it can be seen that if the time for acquiring these additional pulses is held constant, errors will result in the accumulated total, and it is for this reason that a variation in the time period $T_2$ is needed to compensate for transmitter non-linearity.

Turning now to a more detailed consideration of the fourth embodiment of the invention, there is illustrated in FIG. 13 a receiver and display unit which includes an antenna winding 22 feeding a radio frequency amplifier 372. When the receiver and display unit is energized, as by depressing a push button to switch the power on, the energy received by the antenna is amplified and fed by way of an isolation transformer 374 to a second amplifier stage 376. The output of the latter amplifier is fed to a detector 378 to convert the sequential bursts of RF energy to an audio frequency pulse output indicated by waveform 380 Pulse 380 is applied to a wave shaper 382, which converts the pulses to a square wave 384 and feeds it to a phase sweep and locking circuit 386 incorporating a voltage controlled multivibrator oscillator 388 driven by a sweep generator 390. The multivibrator oscillator 388 is driven at a decreasing frequency by the sweep generator until the frequency of its square wave output train 392 matches the frequency of the input signal 384. The oscillator 388 then will lock at that frequency, thereby producing an output wave train on line 394 which has a repetition rate equal to the average rate of the repetitive component of the input waveform 384. In this manner, the circuit locks onto the frequency of the received bursts, and produces a clean square wave signal which is unaffected by jitter, interference, transients, or the like noise. The system as thus far described is capable of detecting a very weak periodic signal out of an input that may consist of 97% noise and only 3% desired signal.

Since a certain amount of time is required for the oscillator 388 to lock onto the fundamental component of the received signal, a lockon delay and reset network 396 is provided to hold the logic circuitry in an "Off" condition until a lock condition is signalled by a voltage on a line 398 leading from oscillator 388 to the delay network 396. When a phase lock is signalled, network 396 produces, after a brief delay, an output on lines 400 and 401. The signal on line 400 resets a preload flip-flop 402 to zero and turns on a gate 404. The signal on line 400 is also applied to a timing counter 406 to reset the counter to zero. The output from the system clock 408, which was turned on by the push button switch, is applied by way of line 410, summer network 412 and line 414 to the input of the timing counter, driving the counter, and, after the counter is reset to zero by delay network 396, the counter begins the timing sequence which results in a display of the parameter value being monitored.

The clock output is also applied by way of line 416 to the input of a gating circuit 418 which feeds these pulses through line 420 to the input of gate 404. Since 404 has been turned on by the output of the locking delay 396, the clock pulses are fed by way of the logic output line 422 to a display counter, or accumulator, in the display unit 424, which has also been reset by the signal applied by way of line 401 from the locking network 396. When the timing counter 406 reaches the preload count corresponding to the intersection of the transmitter characteristic curve with the zero axis, as extrapolated by line 372 in FIG. 12, or in this example a count of 632, the counter produces an output on preload count line 426, which sets the preload flip-flop 402, producing a signal at its output line 428 which turns off gate 418. When the output 428 closes gate 418, the clock pulses still being produced on line 416 can no longer be fed to the display unit, and the 632 count remains in the display accumulator.

During the preload count time $T_1$, the pulse train 392 is being fed through a differentiator network 430; however, the output 432 of the differentiator is tied to ground by way of diode gate 434 which is controlled by the counter time base output stage through line 436. Thus, the data pulse output from the differentiator has no effect on the logic circuit during the preload portion of the logic circuit operation.

After reaching the preload count of 632, counter 406 continues to be driven by the system clock until it reaches a count which signals the end of the first time base $T_1$ of the logic circuitry. In this example, the time base is the length of time required for the counter 406 to accumulate 1024 clock pulses. When this time base count is reached, the time base stage which controls gate 434 goes positive, removing the ground path for the output of differentiator 430. The differentiated wave train 438 is then permitted to pass by way of line 440 to gate 418, and is fed through that gate to the input of gate 404. Since gate 404 is still being held on by the reset signal on line 400, the differentiated pulses of wave train 438 are fed by way of the logic output line 422 to be accumulated in the display unit counter.

The system clock, which is operating at a frequency of approximately 4.5 kilocycles, continues to drive the counter through summer 412 and input line 414 until another count of 1024 is reached, signalling the end of the second time base $T_2$. When the second time base has been completed an output blanking signal appears on output line 442 of the counter to halt the flow of pulses to the display unit. This is accomplished by applying a blanking signal from line 442 through line 444 to the system clock, turning the clock off, and applying a blanking signal by way of line 446 to the lockon delay and reset network 396 to turn off that network and remove the reset signal from gate 404, closing that gate and preventing the pulse train 438 from reaching the logic output line 422. Finally, the blanking signal on line 442 is applied by way of line 448 through a gate 450 and line 452 to the blanking input of the display unit 424 to cause a readout of the count accumulated therein.

During the time $T_2$, when the output pulse train from differentiator 432 is no longer shunted to ground through gate 434, this pulse train is fed by way of line 454 to the input of summer 412. However, line 454 is shunted to ground by way of line 456 and a diode gate 458, for one-half of the second time base. During the second half of time base $T_2$, gate 458 is blocked and no longer shunts pulse train 438 to ground, allowing these pulses to be fed through summer 412 and line 414 to the input of the timing counter 406. The result of this is that the timing counter is driven by both the system clock 408 and the pulse train 438, thereby increasing the speed of the count, and effectively reducing the length of the time base $T_2$, which is defined as the length of time required for the counter to acquire 1024 pulses. Thus, for example, if the system clock 408 is operating at 4.5KC, and the input pulses 438 are arriving at a rate of 1,831 pps (1.831KC), the effective output of the summer 412 is 6.331KC for the second part of the time base $T_2$, and for the full length of the second time base $T_2$, the effective counting rate is 5.425KC. It will be apparent that the effective rate at which the timing counter 406 is driven during the second time base will depend upon the rate of the input pulse train 438, which, of course, is equal to the burst rate of the received signal. Therefore, for a high burst rate, the timing counter is speeded up, and the effective time during which gate 404 is open to feed the received pulses to the display unit is reduced proportionally to the burst rate, and the required compensation for the nonlinearity of the transmitter is obtained.

Reference to FIG. 14 illustrates the waveform developed in the circuit of FIG. 13, with the various waveforms being labelled with their corresponding functions. Thus, waveform 456 is illustrative of the output of sweep generator 390 as it increases in voltage until the multivibrator oscillator 388 locks onto the frequency of the received signal 384. This lockon condition occurs at time $T_0$, after which the frequency of the oscillator remains constant.

As shown by line 458, when the multivibrator locks onto the input frequency, a phase lock signal appears on line 398 which shifts from a high (positive) value to a low (ground reference) value. This shift point is not instantaneous, but requires a finite period of time because of the presence of harmonics and the like; however, when this output of the lockon delay and reset network 396 drops from a high value to a low value, as illustrated in curve 460. This drop occurs at the beginning of time $T_1$, and is delayed beyond the lockon point $T_0$ to eliminate the effects of harmonics and interference in the phase lock signal. When the reset signal 460 drops to its low value, the logic circuitry is turned on, as indicated by curve 462, thereby enabling the various gates to pass counting signals to the output. Curve 464 diagramatically illustrates the square wave input to the multivibrator oscillator, which square wave pulses are received at, for example, 1,831 pulses per second when a temperature of 101° is being sensed by the remote sensor.

The output of the logic circuitry is illustrated by curve 466 which shows a first burst of pulses containing the 632 count which is preloaded into the display counter by way of line 422 (FIG. 13) during the time period $T_1$. As further shown on curve 466, during time period $T_2$ of the logic circuitry, additional pulses (378 pulses in the example) are fed by way of line 422 to the display counter to complete the measurement of the sensed parameter. Upon completion of the second count during time $T_2$, a blanking signal is produced, as indicated by curve 468.

The system clock output produced on lines 410 and 416 in FIG. 13 is indicated by curve 470. As shown, the clock starts to operate at its specified frequency upon application of power to the receiver unit, and continues to produce a continuous frequency output until end of time $T_2$, when it is cut off by the blanking signal from the timing counter 406.

As has been explained, curve shaping is obtained by means of the addition of pulses from differentiator 430 to the output of the system clock; these pulses are indicated by curve 472 and, as illustrated, the curve shaping pulses appear during the second portion of time $T_2$. The effective input to the display counter is indicated by curve 474, with a total of 1010 pulses being applied during the times $T_1$ and $T_2$ in the present example.

It will be noted from FIG. 14 that the length of time $T_2$ is much reduced from the time $T_1$, although both time periods represent a count of 1024 by the timing counter 406. However, because of the curve shaping produced by the pulses indicated by curve 472, the actual elapsed time is reduced. It will be understood that the actual time differential between $T_1$ and $T_2$ will vary with variations in the measured parameter and thus with differences in the rate of the data pulses. The time differential is emphasized in FIG. 14 for clarity.

Figure 16:
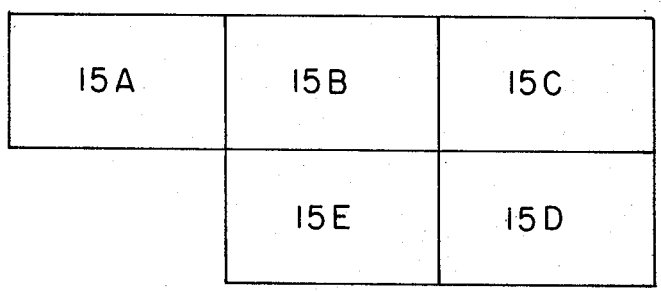
FIG. 16 illustrates the relationship of FIG. 15A–15E.

Turning now to a more detailed consideration of the circuitry of the FIG. 13, FIGS. 15A through 15E disclose in schematic and partial block diagram form the circuit of FIG. 13. It will be noted that the various blocks of FIG. 13 are outlined in FIG. 15, where similar numbers refer to similar elements of the circuit, and the relationship of FIGs. 15A–15E is illustrated in FIG. 16. Furthermore, since many of the circuit elements used in FIG. 15 are commercially available units, only a general description of these elements will be given here, this figure being provided primarily to complete the disclosure of the inventive concept described with respect to FIG. 13.

Figure 15A:
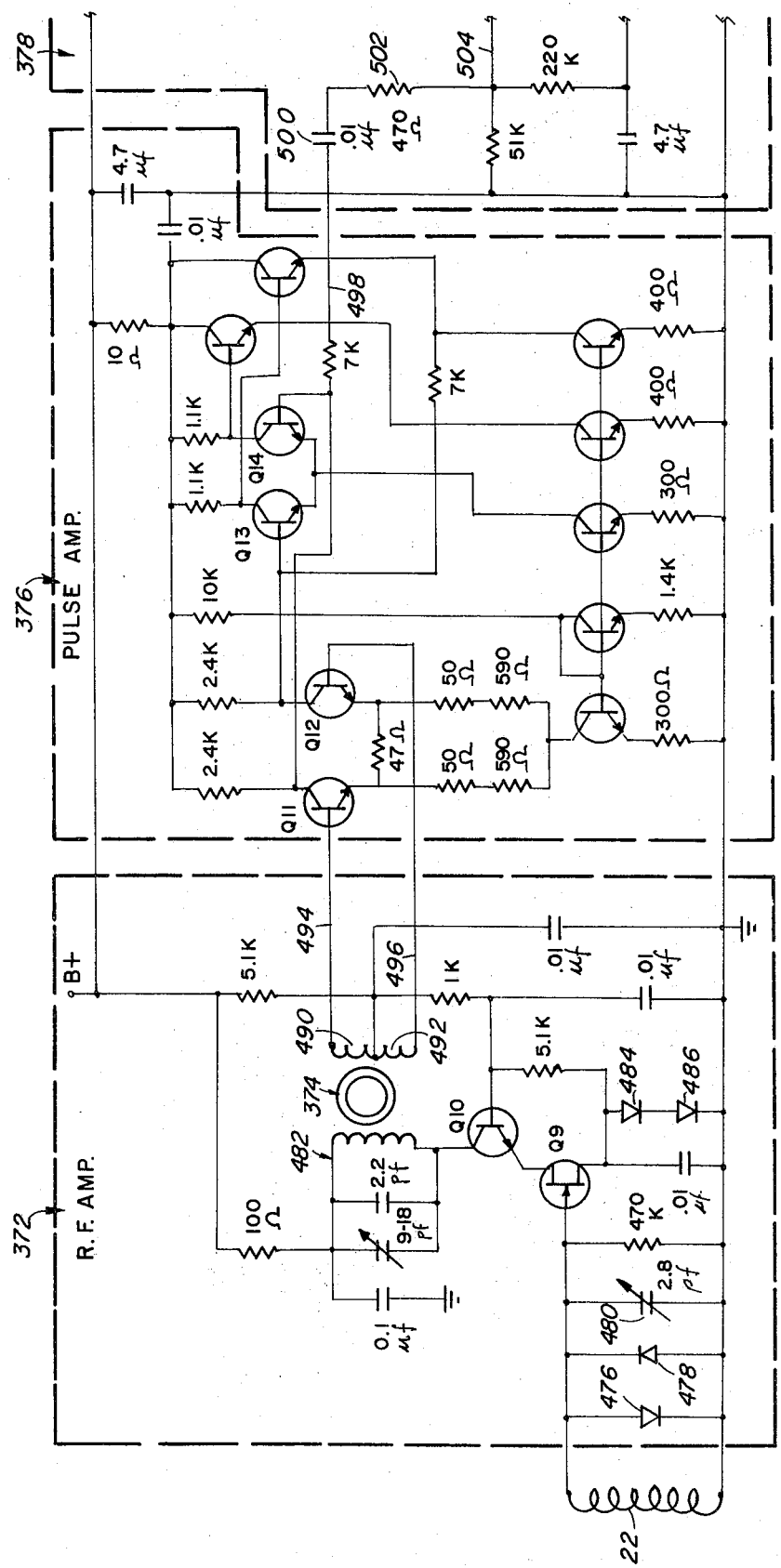
Figure 15B:
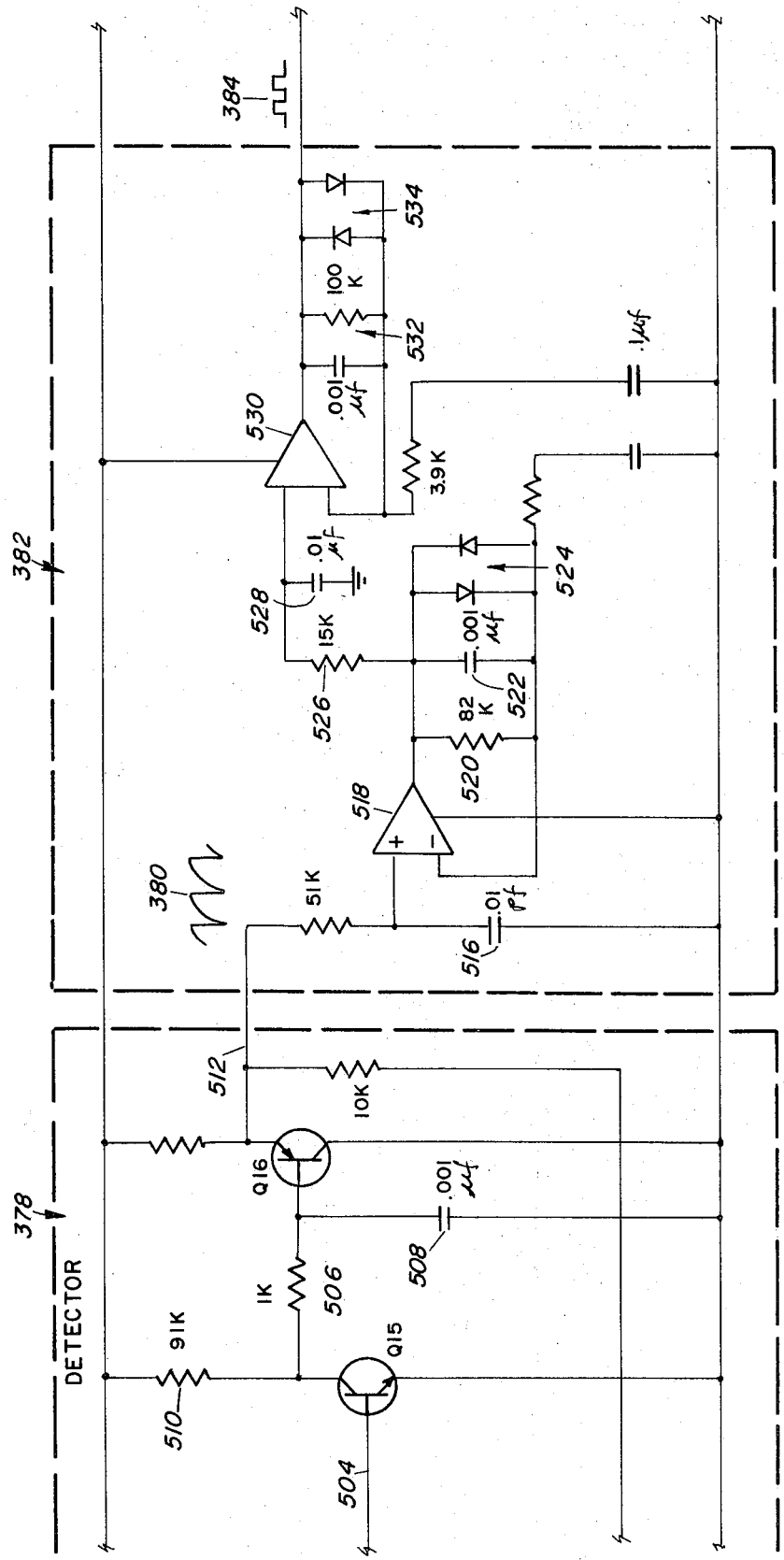
Figure 15D:
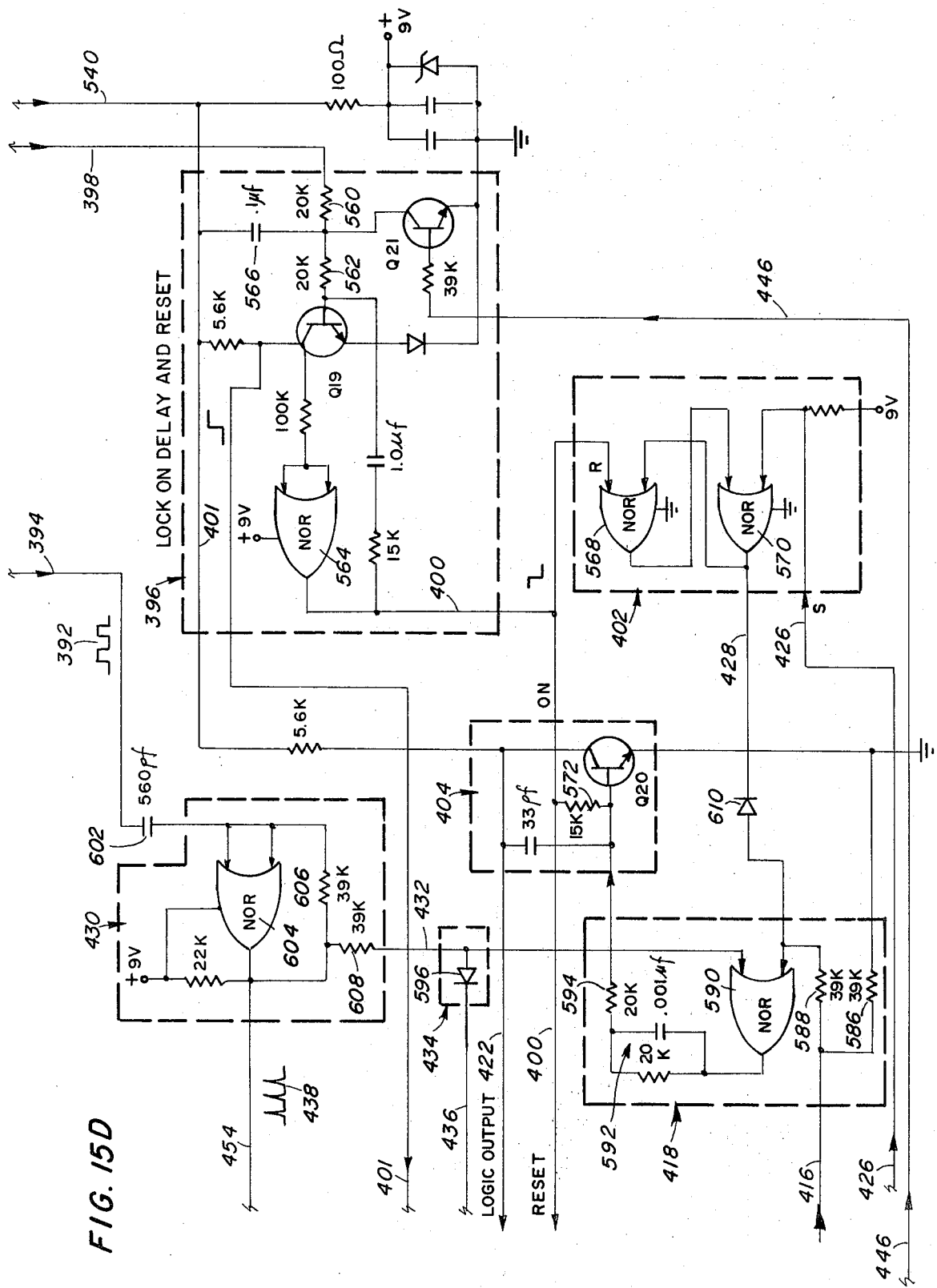

As indicated in FIG. 15A, the receiver of the present system includes an RF amplifier 372, which receives and amplifies signals induced in the antenna winding 22. The input signal is applied across diodes 476 and 478, which serve to limit the input signal, and across a tuning capacitor 480, which is tuned to the frequency of the carrier wave of the transmitter. As noted, the transmission frequency may be in the range of 4.2 mHz, since this is a relatively quiet region of the radio frequency band, and human tissue is transparent to radio waves at this frequency. Thus, capacitor 480 is tuned to 4.2 mHz in a preferred embodiment, although other frequencies may be selected, if desired. The input signals are applied to a field effect transistor Q9 which drives a second transistor Q10, the collector of which is connected to a tank circuit 482 tuned to the radio frequency carrier of the transmitter unit. Diodes 484 and 486 provide bias voltage to the field effect transistor Q9.

The output signal from transistor Q10 appearing in the turned circuit 482 is applied through isolation transformer 374, the signal on the primary winding 488 appearing across the two bifilar secondary windings 490 and 492. The secondary of the isolation transformer produces a push-pull output on lines 494 and 496, the bifilar winding of the secondary and the toroidal arrangement of the core of this transformer preventing radiation by the windings into the antenna circuit, since the toroidal core has a closed field. The output of the RF amplifier 372 which produces a gain of approximately 100, is fed by way of line 494 to the pulse amplifier 376.

Pulse amplifier 376 may be an integrated circuit embodying a two-stage wide band amplifier, and may be of the type manufactured by Silicone General Corporation under the designation SG733/SG733C, as described in that company's technical bulletin 733C published in April of 1971. This amplifier includes a pair of differentially connected first-stage amplifiers Q11 and Q12 feeding a second stage of differential amplifiers Q13 and Q14. Amplifier 376 produces a gain of 300, with the signal appearing on output line 498 being a series of bursts having a repetition frequency equal to that being transmitted by a remote transmitter unit, the bursts having a radio frequency carrier and an audio frequency repetition rate.

The output of amplifier 376 is fed to a detector-demodulator 378 having, an input transistor Q15, which is coupled to line 498 by way of capacitor 500 and resistor 502. The input is applied to the base 504 of transistor Q15, the collector of which is connected by way of an RC filter comprised of resistor 506 and capacitor 508 to the base of transistor Q16, the RC network preventing radio frequency signals from reaching the base of that transistor. The radio frequency bursts applied to the base of Q15 drive that transistor to saturation; how ever, only the strongest signals received will produce an output from this transistor, so that noise and other interference is filtered out at this stage. The predominant pulse received turns Q15 on and off, and when it is conductive it rapidly discharges capacitor 508; when Q15 turns off, capacitor 508 charges slowly through resistor 506 and bias resistor 510. This charging and discharging of capacitor 508 controls the conduction of the transistor Q16 and produces the output waveform 380 on line 512. The pulse rate of the output signal 380 is at the audio frequency of the predominant signals received by the transistor Q15 so that the detector 378 discriminates against weak signals.

Because of the presence of noise interverence, the waveform 380 may be jittery and hard to handle. Accordingly, the waveform 380 is passed through another RC filter comprised of resistor 514 and capacitor 516, the junction of these two elements being connected to the input of an amplifier 518 in the wave shaper 382. This wave shaper is designed to convert the jittery pulse 380 into a stable square wave signals that can be used to drive the following circuitry. Amplifier 518 is of a conventional and commercially available type, and may, if desired, be in the form of an integrated circuit. The output of this amplifier is again filtered by the parallel network of resistor 520 and capacitor 522, with a pair of clipping diodes, indicated at 524, limiting the output of the amplifier. The filtered and clipped signal is fed by way of resistor 526 and capacitor 528 to the input of a second integrated circuit amplifier 530, which again amplifies the signal. Once again, the signal is filtered by means of RC network 532 and clipped by limiting diodes 534 to produce the square wave output signal 384. This waveform represents the fundamental component of the receiver input signal and is fed to the pulse lock circuit 386.

In a preferred embodiment of the invention, the phase lock network includes a multivibrator oscillator 388 and a sweep generator 390, as has been described. Oscillator 388 may be an integrated circuit such as that manufactured by the Signetics Corporation of Sunnyvale, Calif., which manufactures a tone and frequency decoder under the designation NE567V. This tone and frequency decoder is a highly stable phase-locked loop with synchronous AM lock detection and power output circuitry. Its primary function is to drive a load whenever a sustained frequency within its detection band is present at its self-biased input line 536. The NE567V tone decoder is described in detail in the publication entitled "Tone Decoder-Phase Locked Loop Linear Integrated Circuits" printed by Signetics Corporation in December of 1970.

Since NE567V circuit is basically designed for a very narrow frequency band of input signals, on which it will lock to produce a steady output frequency, the circuit is modified by the present invention through the provision of the sweep circuit 390, which enables the circuit to lock onto signals in wide frequency ranges, as required for detecting input signals representing the desired range of parameters to be measured by the remote sensor-transmitter unit. This sweep generator is designed to bring the oscillator into the capture range of the input signal, at which time the oscillator will be voltage controlled to match the frequency of the input signal.

The sweep circuit 390 includes a storage capacitor 538 which is connected to the positive bias voltage supply line 540 by way of a resistor 542, a diode 544, and a resistor 546. When the power to the receiver unit is turned on and bias voltage applied to line 540, capacitor 538 begins to charge. The junction between capacitor 538 and resistor 546 is connected to the base of a transistor amplifier Q17, which conducts in accordance with the charge on the capacitor. The output of Q17 is amplified by a second amplifier stage Q18, and as Q18 goes toward saturation, capacitor 548, connected in series with the collector of Q18, becomes more and more in parallel with a shunt capacitor 550. Capacitors 548 and 550 provide the time constant for the multivibrator 388, and as the combined capacitance of 548 and 550 is changed by Q18, the frequency of oscillator 552 changes from a relatively high frequency toward the frequency of the input signal on line 536.

When the voltage controlled oscillator 552 reaches a frequency which matches that of input waveform 384, as indicated by the phase detector 554 and the quadrature phase detector 556 which compare the output of the voltage controlled oscillator with the input signal, the oscillator 388 will signal the existence of a phase lock condition by producing a zero voltage on line 554. This zero voltage will appear on output line 398 (see Waveform 458 in FIG. 14) and will shut off the sweep circuit. Oscillator 388 will then continue to oscillate at the input frequency, producing square wave output pulses on line 394 at the frequency of the input. This square wave signal will be the data rate signal and will have a rate equal to the transmitter burst rate even in the presence of random noise or jitter. If the input should experience some phase jitter, the oscillator 388 will produce good stable output by reason of the feedback within the circuit. The oscillator can follow changes in the input signal over a period of time, but will ignore noise and other undesirable transients and variations in the input.

It will be noted that the change in the output on line 554, signalling the existence of a phase lock condition will not be a sharp change where weak input signals are present, for under these conditions, it takes time for the circuit to recognize and achieve a lock condition. Thus, the curve 458 exhibits an instability between the non-lock and lock conditions which produces uncertainty in the output. For this reason, a delay network 396 is interposed to prevent operation of the circuit until a lock condition has been achieved. It should be noted, however, that this delay time is very short, with the total time period between power on and phase lock being less than one-half second.

It should be noted that the circuitry so far described is required to detect very weak input signals; if the receiver unit is placed very close to the sensor-transmitter, e.g., within about 4 inches, a simple single transistor receiver could be used with a meter to obtain a readout. However, such a circuit would be unsatisfactory for most purposes, and accordingly the system herein described is preferred.

The sweep generator in the lock circuit 386 is capable of a two to one frequency sweep, due to the variation of the effective capacitors 548 and 550. This effective capacitance varies from .02 microfarads when transistor Q18 is non-conductive to 0.04 microfarads when Q18 is fully saturated. This sweep circuit prevents the system from locking onto harmonics and, by using a charging capacitor to produce the desired sweep, avoids the use of a high frequency oscillator that might produce interference at the receiver antenna.

In the prior embodiments of the system described hereinabove, there was no phase lock signal produced, and thus no indication of when the received signal and the multivibrator output were in phase and at the same frequency. Thus, it was necessary to wait a considerable length of time after applying power to the receiver unit to allow the receiver system to stabilize. Then if the data readout appeared reasonable to the operator of the system, e.g. if the reading was within the expected temperature range, it would be assumed that the reading was correct. However, this type of arrangement could easily produce a false reading that the operator would not be able to detect. Further, the loss of phase lock during the computation of the readout value would not, in the prior embodiments, stop the calculation and this could lead to additional errors. In the present device, on the other hand, loss of the phase lock signal results in a resetting of the logic circuitry, so that no data readout can be obtained, thus positively assuring that either a correct readout will be produced or there will be no readout at all.

Once a phase lock condition is attained, and the multivibrator oscillator 388 is producing a train of pulses 392 at the average repetition rate of the received signals, it becomes necessary to convert this data pulse into a temperature reading and at the same time to compensate for curvature in the sensor output characteristic. To this end, the phase lock signal on line 398 is fed by way of input resistors 560 and 562 to the base of a transistor Q19 in the lockon delay and reset network 396. As may be seen by curve 458 in FIG. 14, the signal on line 398 is high prior to the acquisition of phase lock, allowing transistor Q19 to conduct and thus maintaining a low input to a NOR gate 564. When a lockon condition occurs, the signal on line 398 drops to a low value, cutting off transistor Q19, causing the input of the NOR gate to go positive and producing an output on line 400 which enables the remainder of the logic circuit.

The logic circuitry of the present invention utilizes low power, COS/MOS integrated circuit gates providing a NOR positive logic. In these gates, if either or both of the inputs to the gates goes high, the output goes low. Thus, when Q19 becomes non-conductive to produce a high input on both of the inputs to NOR gate 564, a low signal appears on line 400, which produces the required setting and resetting functions described with respect to FIG. 13. A suitable NOR gate for use in the present invention is available from RCA Corporation and is identified as the type CD4001 Digital Integrated Circuit. This commercially available integrated circuit is described in detail in a publication of the RCA Corporation Electronic Components Division, Harrison, N.J., printed in August 1968 and reprinted in March 1970 under File No. 345.

A delay in the operation of network 396 is provided by means of a capacitor 566 connected between the junction of resistors 562 and 560 and the bias supply line 540. When Q19 is turned off to produce the output on line 400, a positive signal is also applied by way of line 401 to reset the display unit 424, this display reset signal being derived from the collector Q19 rather than from the output of NOR gate 564. The signal on line 400 is applied to the reset input of flip-flop 402, which is made up of a pair of NOR gates 568 and 570, resetting this gate in preparation for the setting input pulses from the preload bus 426. The negative-going signal on line 400 is applied to gate 404, biasing the gating transistor Q20 on by way of a biasing resistor 572. The negative-going reset pulse is also applied to the reset input of the counter 406, (FIG. 15E) to enable the counter. Although any suitable counter may be used in the present system, in one embodiment of the invention the counter 406 consisted of a pair of type CD4004A COS/MOS seven stage binary counters interconnected to provide the twelve counting states indicated in FIG. 15E. Binary counters of this type are described in detail in the publication of the Solid State Division of the RCA Corporation in a technical publication printed in March of 1971 and entitled "Digital Integrated Circuits - CD4000A Series, "File No. 479, Pages 7-10.

Figure 15E:
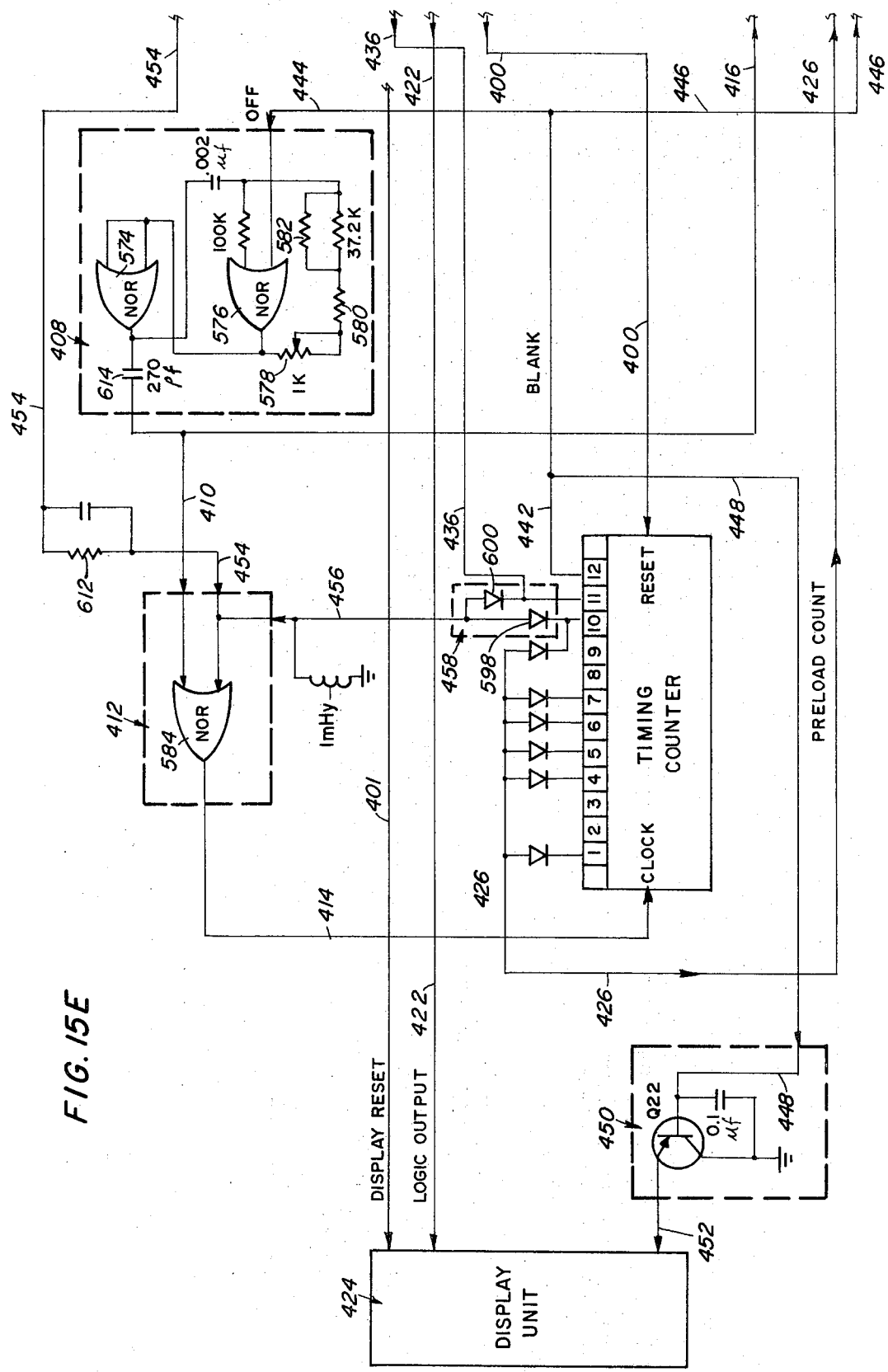

As shown in FIG. 15E, the system clock 408 comprises a pair of NOR gates 574 and 576 cross-connected in conventional manner to oscillate at a specified frequency, as determined by the setting of potentiometer 578 and the value of trim resistors 580 and 582. The output from the clock is fed by way of line 410 to the input of a summing gate 412 which is comprised of a NOR gate 584. The output of the clock is also applied by way of a voltage divider made up of resistors 586 and 588. This clock output is applied to one of the inputs of a NOR gate 590, the output of which is applied through an RC network 592 and a resistor 594 to the base of transistor Q20 in gate 404, thereby to feed clock pulses to the logic output line 422, whenever gate 418 and gate 404 are both turned on by their respective controls.

The clock signals applied by way of line 410 to NOR gate 584 in the summer circuit 412 produce corresponding output pulses on the summer output line 414 which are applied to the clock input of counter 406. These clock pulses drive the counter in the conventional manner, shifting the various outputs of the counter from a low, or ground, potential to a high, or positive, potential at specified counts. Thus, the first output line produces a positive output for alternate clock pulse inputs with the succeeding stage being shifted to a high value each time the preceeding stage is shifted to a high value. When stages 1,4,5,6,7 and 10 have all been shifted to their high values, this condition indicates that 632 pulses have been applied to the timing counter 406. Each of these terminals is connected through a corresponding diode to preload count line 426 so that when stages 1,4,5,6,7 and 10 are high, a signal will be applied by way of line 426 to the set input of flip-flop 402, shifting the flip-flop to produce a ground potential at output line 428 which will cut off gate 418 and prevent further clock pulses from being applied by way of line 416, gate 418, gate 404, and line 422 to the display unit.

The output from stage 11 of the timing counter 406 is applied by way of line 436 to gate 434, which is a diode element 596. As long as output 11 of the counter is low, diode 596 is conductive in the forward direction and any output signal appearing on line 432, which is the output from differentiator 430, will be shunted through the diode gate to ground. However, when stage 11 of the counter shifts, signalling that the counter has received 1024 pulses from the clock, diode 596 becomes nonconductive in the forward direction and output signals on line 432 may be fed through line 440 to gate 418. the count on stage 11 signals the end of time $T_1$ (see FIG. 14) and thus this output constitutes the time base output of the counter.

Energization of the curve bending circuitry is accomplished by gate 458 (FIG. 15E) which includes the diodes 598 and 600 connected to stages 10 and 11, respectively, of timing counter 406. As long as one of the stages 10 or 11 is low, one or the other or both of these diodes will be conductive to ground, whereby one of the inputs to NOR gate 584 will be grounded by way of line 456, effectively grounding output line 454 from differentiator network 430. When a count of 1536 has been reached, which is half-way through the time period $T_2$, both terminals 10 and 11 of the counter will be up and diodes 598 and 600 will be non-conductive. Thereafter, output pulses from the differentiator 430 appearing on line 454 will be fed through NOR gate 584 to the summer output line 414 for application to the clock input of the timing counter.

The data pulse 392 on line 394 is applied by way of a capacitor 602 to the input of a NOR gate 604 which makes up the differentiator 430. Waveform 392 is applied to those inputs of the NOR gate, with capacitor 602 and resistors 606 and 608 serving to differentiate the pulses whereby the outputs on lines 454 and 432 are in the form of spikes such as those shown in the waveform 438.

As will be understood from the description of FIG. 13, as soon as the phase sweep and lock circuit 386 acquires the received signal and produces a phase lock signal on line 398, the logic circuitry is reset to a condition preparatory for producing a count in the display unit which corresponds to the repetition rate of the input pulses 392. Accordingly, the timing counter is enabled and begins to count the first 632 pulses which are to be applied to the display unit. These pulses are applied by way of line 416, gate 418 and gate 404 to the display unit, the latter two gates being held in their on condition by the output of the preload flip-flop 402 and by the reset pulse, respectively When the preload count of 632 has been reached, flip-flop 402 is set, producing a low output on line 428 and effectively grounding clock pulse line 416 by way of diode 610 in line 428.

At the end of time $T_1$, stage 11 of the timing counter goes high, signalling the start of time base $T_2$, causing diode 596 in gate 434 to become non-conductive and allowing output pulses on line 432 to be applied to gate 418. These pulses, which represent the data rate which varies with the measured parameter, are fed through gate 418 and gate 404 to the logic output for the length of time base $T_2$, so that the total number of pulses accumulated in the display unit will vary with the data rate.

In prior devices, the timer period during which the data rate was fed to the display accumulator was preselected to a fixed length of time, corresponding to the time that would represent the linear average slope of the characteristic curve of the transmitter output. However, the use of such an arbitrary straight line average time base insured that there would almost always be an error in the displayed readout, with the greatest error occuring at the mid-range of the temperature, where the highest accuracy is in fact needed in hospital usage. The device of FIGS. 13 through 15 modifies the prior approach by varying the time during which the data rate is fed to the display accumulator in accordance with the frequency being received. As will be seen from FIG. 12, the characteristic of the pulse rate versus temperature of the transmitter varies with frequency, with increasing temperature causing a greater frequency deviation from the initial slope of the characteristic curve. Thus, by shortening the time $T_2$ in proportion to the received frequency, the characteristic of the transmitter can be matched in the receiver to an extent which substantially eliminates error.

Again, as shown in FIG. 12, a straight-line tangent taken at the mid-point of the temperature versus pulse rate characteristic of the transmitter will cross the zero frequency axis at approximately 63.2°F., the exact crossing depending upon the exact curvature characteristic. Although the intersection point will vary slightly with each transmitter so that the tangent line will not always cross at 63.2°F., nevertheless a change of as much as four degrees one way or the other in the intersection point will still produce sufficient accuracy for the present invention. Accordingly, 632 pulses are selected for initial insertion (preload) into the display unit accumulator during time base $T_1$, in the manner described above.

After the preload count has been completed, the timing counter continues to operate until 1024 pulses have been applied by the clock, at which time the terminal of stage 11 of the counter 406 goes high, signalling the start of time $T_2$. It will be understood that stage 11 will stay high for an additional 1024 pulses, at which time it will go low and stage 12 will go high to produce the unblanking signal on line 422.

When stage 11 goes high, then the data pulses from the differentiator 430 are applied to the logic output line 436, and this continues until stage 10 of the timing counter also goes high half-way through time $T_2$, or after 1536 pulses have been applied to the clock input. At this time, when both stages 10 and 11 are high, the differentiator output pulses on line 454 are permitted to pass to the input of NOR gate 584 and then to the clock input.

In order to insure that the pulses being applied to summer 412 from the clock circuit 408 and from the differentiator 430 do not interfere with each other, and to insure that each pulse is separately counted, these inputs must be in the form of very narrow input spikes, each spike being of the order of 0.5 microseconds time duration. This is accomplished in the following manner. The data rate pulses 392 are fed to the differentiator 430 through an input capacitor 602 to the NOR gate 604, and this capacitor acts with feedback resistor 606, coupled between the output and input of the NOR gate to differentiate the input pulses. The output of the NOR gate is fed through an RC network 612 to the input of the summer gate 584, this input being a pulse train of very narrow pulses at the 9 volt power supply amplitude.

The clock circuit output on line 416 is differentiated by means of a capacitor 614 connected to the output of the clock NOR gate 574 (FIG. 15E) and resistor 586 (FIG. 15D) which is connected between line 416 and ground. This RC network produces pulses approximately five microseconds wide, which serve to operate the system through the time period $T_1$. When the 632 count is reached by counter 406 and the output of gate 402 drops to its low, or ground reference, value to prevent any further output from gate 418, the resultant forward conduction of diode 610 in line 428 effectively places resistor 588 in parallel with resistor 586 and changes the time constant of the differentiator network connected to the output of the clock generator 408. This change in the differentiator network sharpens the output pulses from the clock, changing them from the 5 microsecond pulse width required to drive the display unit accumulator to a 0.5 microsecond pulse width. These narrow pulses will still drive the system counter, and can be used during time $T_2$ since they are not needed during this time period to drive the display accumulator. The application of pulses of 0.5 microsecond duration to the two inputs of summing gate 584 insures that there will be no overlap and that both pulse trains will be counted.

Accordingly, during the time that both stages 10 and 11 of the counter stage 406 are positive, an increased count is applied by way of summer 410 to the clock input of the counter, one input being that the normal system clock and the other input being the pulse train 438 that is equal to the data rate of the received signal. By increasing the rate of pulses applied to the clock input of the timing counter, the effective length of time $T_2$ is shortened since the 1024 pulses required to complete the time base $T_2$ are fed to the counter in less time than would be the case if only the clock output were applied to the counter.

When the count of 2048 is reached, ($T_1$ plus ($T_2$), stages 10 and 11 of the timing counter go low and stage 12 goes high, producing a blanking signal on line 442 which shuts down the logic circuit, as has been described. The blanking signal is also applied by way of line 444 to the input of the system clock, stopping the operation of the clock oscillator, and is applied by way of line 446 to the base of a transistor Q21 in the lockon delay network 396 (FIG. 15D), causing Q21 to saturate to ground the input to network 396 and preventing further operation of this network.

By stopping the clock, and thus the timing counter 406, and by grounding the input to the lockon delay network 396, the logic circuitry is "frozen" in this condition and remains that way until the system is reset by removing power and starting over again. This enables the display unit to operate and to be held in an operable condition for as long as is desired by the operator of the receiver unit.

The blanking signal from the timing counter is also applied by way of line 448 to the base of a transistor Q22 in gate 450, cutting off the transistor and producing a positive-going unblanking signal on line 452 which enables the display unit to produce an optical readout that can be held as long as desired.

Figure 17A:
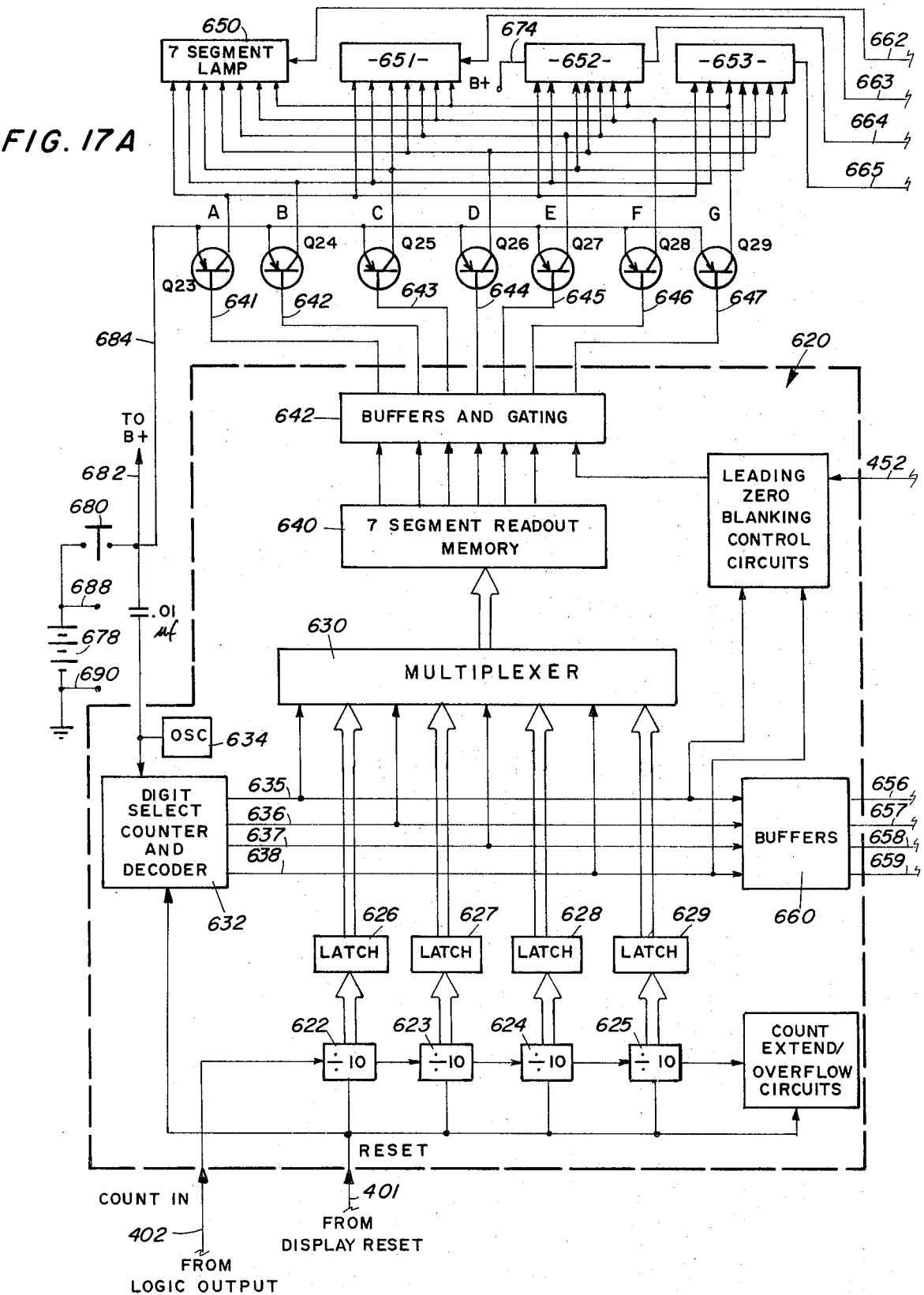
FIGS. 17A and 17B diagram the display unit of FIG. 13.
Figure 17B:
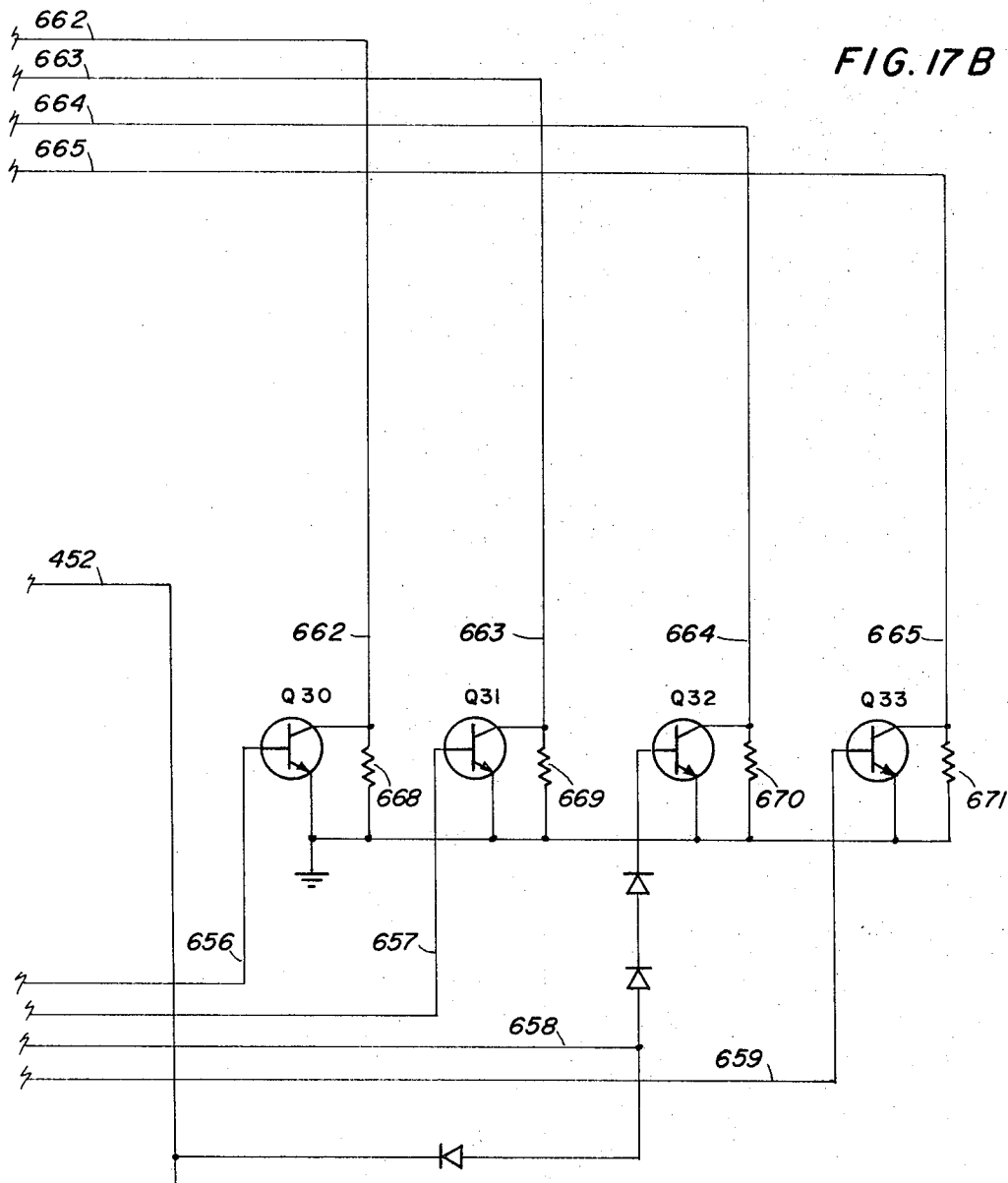

The dispaly unit 424 is illustrated diagramatically in FIGS. 17A and 17B to which reference is now made. The basic element of the display unit 424 is a digit counter/display decoder 620, which serves to accumulate the pulses fed to it by way of line 402 and to energize a plurality of display lamps so as to provide a digital readout of the accumulated count. A suitable decoder for this purpose is produced by the Mostek Corporation of Carrollton, Tex. and is commercially available from that company. The present device preferably uses a type MK5002P decoder made by that company, and which is designed to feed a four-digit display. This unit is a four decode synchronous counter, with latches, multiplesing circuits, and a read-only memory programmed to feed seven-segment display lamps. This unit is described in detail in a data sheet published by the Mostek Corporation in October 1971, entitled "MOS 4 Digit Counter/Display Decoder," with its operational characteristics being further described in an "Applications Note" published by Mostek Corporation in September 1971 entitled "Operation of the MK5002P MOS 4 Digit Counter Decoder."

A functional diagram of MK5002P decoder is illustrated in FIG. 17A. As shown, the input count from the logic circuit is applied by way of line 402 to a four decade counter comprising divider stages 622 through 625. After these counter stages are reset by a signal on line 401, they accumulate the input count, with the outputs of the counter stages driving corresponding latching circuits 626 through 629. These static latching circuits retain the count supplied by the counters 622 through 625. The outputs of the latching circuits are fed to a multiplexer 630 which is driven by a digit select counter and decoder 632, which is, in turn, driven by an oscillator 634. The oscillator operates at about 6.4KC, driving decoder 632 to sequentially select its output lines 635 through 638, the decoder repetitively sweeping these output lines to scan sequentially the latching circuits 626 through 620. This scanning of the multiplexer 630 causes the count stored in each of latches 626 through 629 to be sequentially fed to a seven-segment readout memory circuit 640, sending one decade count at a time to the output of the decoder 620 by way of suitable buffers 642. Thus, the digit stored in latching circuits 626 is fed by the multiplexer 630 to the seven-segment readout memory 640 and thence to the seven decoder output lines 641 through 647. Thereafter, the multiplexer feeds the count in LATCH circuit 627 through memory 640 and buffers 642 to the output lines, and so on until the count in each of the LATCH circuits has been fed to the output. This cycle is repeated at a rate of 6.4 KC.

Figure 18:
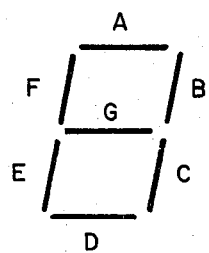
FIG. 18 illustrates the filament arrangement of a display lamp.

The particular count the latching circuit, which is connected at any instant to the output lines 641 through 647, will produce a specific and corresponding combination of output signals on these output lines. This combination of output signals represents the count in a given latching circuit, and is fed by way of corresponding transistors Q23 through Q29 to appropriate input pins of the seven-segment lamps 650, 651, 652 and 653, whereby the appropriate lamp segments are energized in accordance with the applied combination. As will be seen in FIG. 17, the output of each of the transistors Q23 through Q29 is applied to a corresponding segment in each lamp. The filaments of a typical seven-segment lamp are illustrated in FIG. 18, and as may be seen the filaments may be identified by the alphabetical designations A through G. Transistor Q23, therefore, may be so connected as to energize the A filaments in each of lamps 650 through 653, transistor Q24 may be connected to energize each of the B filaments of these lamps, and so on, with transistor Q9 energizing the G elements of each of the lamps. It will be understood that various combinations of filaments may be illuminated by causing corresponding transistor to be energized, with the selected combination producing a specific digital display.

In order to insure that each lamp will display only the digit corresponding to the count stored in a corresponding one of the counter stages, so that the count in circuit 626 will be displayed on lamp 650, the count in LATCH 627 will be displayed in lamp 651, the count in latching circuit 628 will be displayed in lamp 652, and the count in LATCH 629 will be displayed on lamp 653, the lamps are not illuminated when energized by transistors Q23 through Q29 alone. The lamps are so connected that they can become incandescent only when selected by a corresponding digit-select output appearing on a corresponding one of the outputs 656 through 659 from decoder 620. These output lines are selected by the digit select counter and decoder 632 by way of lines 635 through 638 and corresponding buffers 660, so that they are selected sequentially and in synchronism with the operation of multiplexer 630. The outputs 656–659 drive transistor switches Q30 through Q33 respectively, with the output of Q30 being fed by way of line 662 to enable lamp 650, the output of transistor Q31 being fed by way of line 663 to enable lamp 651, the output of transistor Q32 being fed by way of line 664 to enable lamp 652 and the output of transistor Q33 being fed by way of line 665 to enable lamp 653. Thus, the lamps are scanned at a rate of 6.4 KC in synchronism with the application of the counts to these lamps from their corresponding latches, whereby each map will in sequence display its corresponding count. Only one lamp at a time is thus illuminated, reducing the current drain of the display unit, the scan being sufficiently rapid to permit easy reading of the display.

As shown in FIG. 17B, transistors Q30 through Q33 are each bypassed by means of resistors 668 through 671, the bypass resistors serving to apply a low-level current to the lamp filaments so that they are partially on all the time. This prebiasing of the filaments keeps them just below incandescence, so that when corresponding ones of the selector switches Q30 through Q33 are scanned, the lamps will immediately turn on and become visible. A further advantage of this arrangement is that it allows operation of the lamps at lower voltage, although at the expense of current flow, and thus eliminates the weight, space and cost of the additional power supply batteries that would be needed to raise the voltage.

In lamp 652, a filament representing the decimal point of the digital readout is connected to the battery supply by means of a wire 674. Because of this direct connection, which caused the decimal point to be illuminated before the system has acquired a count to be displayed, it was found that the scanning of transistor switches Q30 through Q33 caused the decimal filament to be cycled at a rate which produced interference with the receiver system. This interference has been eliminated in the present device by means of a bypass diode 676, connected between select output line 658 and the blanking line 452 from the logic circuit. Prior to acquisition of a count, the blanking output (from transistor Q22 to FIG. 15E) is low, providing a ground for diode 676 and effectively shunting the output on line 658 to ground. This prevents transistor Q32 from turning on during the digit select scanning prior to the receipt of a blanking signal, and thus prevents the decimal filament from becoming illuminated. However, after a blanking output is received from transistor Q22, at which time line 452 goes high, diode 676 is blocked and the signal appearing on line 658 is applied to the base of transistor switch Q32. Thereafter, the lamp 652 is scanned in the manner described above, but since a count has been acquired any resultant noise does not affect the receiver.

In FIG. 17A there is illustrated the receiver power supply battery 678, which may consist of eight rechargable nickel cadmium batteries, connected between a ground point and a push button switch 680. Switch 680 is the main power switch for the receiver and its closure applies battery power to the logic circuitry of FIG. 15 by way of line 682 as well as to the display unit by way of lines 684 and 686. Connected to the positive and negative terminals of battery 678 are a pair of contacts 688 and 690 which extend to the exterior of the receiver housing to enable the receiver batteries to be recharged.

It will be understood that care must be taken in packaging the receiver and display unit to avoid the noise feedback from the logic and display circuitry to the receiver antenna. Therefore, the placement and shielding of the various elements of the circuit is important. The receiver will preferably be packaged in a small housing having the four readout lamps 650 through 653 visible on the upper face with the push button 680 being conveniently located for one-hand operation. The recharging terminals 688 and 690 may be located on the bottom of the housing so that when not in use the receiver unit can be placed on a matching stand having corresponding charging terminals which will come into contact with terminals 688 and 690 to recharge the batteries 678.

In operating the overall system it will be seen from the foregoing that the method of detecting and measuring a physiological parameter of a subject includes locating a sensing element at a position in relation to the subject that a property of the sensing element is modified in accordance with the value of the parameter, and developing in a transmitter winding bursts of magnetic field energy at radio frequency and at a burst rate that varies in accordance with the value of the property of the sensing element, the bursts of magnetic field energy being developed within the extreme-near-field region corresponding to the wave length of the radio frequency. The method further includes locating a receiver winding at a position spaced from the transmitter winding but within the extreme-near-field region, whereby bursts of electrical signals are developed in the receiver winding at the burst rate, and measuring the frequency at which the received bursts occur to provide and indication of the value of the parameter of the subject being measured. In preferred forms of the invention, the method may also include shielding the receiver winding from electrostatic signals to increase the signal-to-noise ratio of the bursts, and the step of measuring may include demodulating the received bursts to produce a pulse train having a frequency equal to the burst rate and counting the number of pulses received over a selected period of time.

As described above, the measurement of the pulses may include adding to the counted number of pulses a fixed number of pulses so that the total of the fixed number and the counted number of pulses represents the value of the measured parameter. Additionally, the measuring step may include varying the selected period of time in accordance with the burst rate to compensate for nonlinearities in the property of the sensing element. The final step of the described method includes displaying a digital representation of the total number of pulses representing the value of the measured parameter.

Thus, there has been disclosed a new and novel temperature measuring system for transmitting by means of radio frequency waves a pulse signal having a frequency corresponding to a measured parameter, a receiver which is capable of detecting the transmitted pulses, converting the received pulse rate to a corresponding digital signal, and displaying on an optical readout a digital representation of that measured parameter. The system includes means for correcting for non-linearities in the transmitted signal for assuring a correct readout within the required degree of accuracy. Although the invention has been disclosed in terms of specific embodiments thereof, it will be apparent to those of skill in the art that numerous variations and modifications can be made without departing from the true spirit and scope of the invention as described in the following claims.

What is claimed is:

1. A system for transmitting and receiving signals corresponding to a physiological parameter of a subject, comprising:
   a sensing element adapted to detect a desired physiological parameter of the subject;
   a transmitter adapted to transmit radio frequency signals modulated in accordance with signals that correspond to the detected physiological parameter, and
   a receiver unit adapted to inductively receive said transmitted signals, said receiver unit including demodulator means for producing a train of pulses at a frequency corresponding to the frequency of modulation of said radio frequency siganls;
   phase lock circuit means adapted to generate a range of frequencies that overlaps said frequency of modulation, said phase lock circuit means being connected to receive and compare the pulses developed at the output of said demodulator with said range of frequencies, whereby said phase lock circuit means locks onto, and thereafter generates output pulses at a rate corresponding to, said frequency of modulation; and
   means responsive to said output pulses for measuring the burst rate of the received radio frequency signals to indicate the magnitude of said physiological parameter.

2. The system of claim 1, wherein said means responsive to said output pulses comprises:
   a timer unit including a clock-pulse source, a timer counter, and means for feeding clock pulses from said clock pulse source to said timer counter;
   means for producing a first predetermined number of auxiliary pulses during a first timer interval;
   means controlled by said timer unit for gating said output pulses during a second timer interval;
   accumulator means; and
   means controlled by said gated pulses and by said auxiliary pulses for storing in said accumulator means a manifestation of a total-number representing the value of said parameter.

3. The system of claim 2, further including
   a device for displaying numbers in visible form, and
   means controlled by said accumulator means for operating said device to display invisible form numbers corresponding to the total number of pulses in said accumulator means.

4. The system of claim 2, further including means for modifying said second time interval to compensate for nonlinearities in the output characteristic of said transmitter.

5. The system of claim 4 wherein said means for modifying said second time interval comprises scanning means for feeding to said timer counter both said clock pulses and said output pulses to increase the counting rate of said timer counter.

6. The system of claim 5, further including gate means for preventing said output pulses from reaching said summing means during a predetermined portion of said second time interval.

7. A telemetering system for monitoring a physiological parameter of a plurality of spaced apart patients respectively, comprising:
   a separate telemetering transmitter mounted on each of the different patients, each of said transmitters comprising a blocking oscillator adapted to generate carrier waves of about the same radio frequency at a burst rate that corresponds to the physiological condition of the patient on which said each transmitter is mounted, and
   a single telemetering receiver for receiving signals at the aforesaid radio frequencies, said receiver including
   a. a demodulator having a pulse-amplitude discrimination circuit whereby the strongest of the signals received from said transmitters are detected and signals from other transmitters are suppressed, and
   b. means responsive to the output of said demodulator for measuring the burst rate of the received signals to indicate the physiological parameter of the patient on which the corresponding transmitter is mounted without interference from signals of any other of said transmitters.

8. The telemetering system of claim 7, wherein said means for measuring the burst rate of said received signals comprises:
   an accumulator for storing a total-number in digital form;
   auxiliary means for producing a set of digital signals that are at least partially dependent on the value of said parameter at a zero burst rate;
   a timer unit, including a clock pulse source, and a timer counter;
   starter means for initiating operation of output counter, said timer unit, and said auxiliary means;
   means controlled by said starter means for feeding pulses from said clock pulse source to said timer counter whereby a timing operation is initiated;
   means controlled by said starter means for feeding said set of digital pulses to said accumulator;
   means controlled by said timer unit for feeding pulses corresponding to said burst rate to said accumulator; and
   means controlled by said timer unit when the number of clock pulses fed to the timer counter has reached a predetermined count for discontinuing the feeding of further pulses to said accumulator.

9. The telemetering system of claim 8, further including means for modifying said timer unit whereby the time elapsed for reaching said predetermined count is varied in accordance with said burst rate.

10. The telemetering system of claim 9, wherein said means for modifying said timer unit includes means for feeding said pulses corresponding to said burst rate to said timer counter.

11. The telemetering system of claim 10, wherein said means for discontinuing the feeding of further pulses to said accumulator comprises blanking means for disabling said clock pulse source.

12. The telemetering system of claim 11, further including display means responsive to the total number of pulses in said accumulator to display a digital representation of the physiological parameter of the transmitter signals being received.

13. The telemetering system of claim 7, further including phase lock means responsive to the output of said demodulator for producing a stable square wave pulse train having a repetition rate equal to the average repetition rate of said demodulator output.

14. The telemetering system of claim 7, wherein said means for measuring the burst rate of the received signals includes compensating means for correcting for nonlinearities in the burst rates of the signals generated by said transmitters.

15. The telemetering system of claim 14, wherein said compensating means utilizes the burst rate of the received signal for correcting for said nonlinearities.

16. In a system for measuring the burst rate of a train of bursts of radio frequency signals;
   a receiver tuned to receive such radio frequency signals;
   a demodulator operated by said receiver for producing a train of pulses at a frequency corresponding to the burst rate;
   pulse shaping means including a phase lock circuit adapted to sweep over a range of frequencies that overlaps the burst rate, said phase lock circuit being connected to receive the pulses developed by said demodulator whereby said phase lock circuit generates output pulses at a rate corresponding to said burst rate;
   measuring means responsive to said output pulses for producing a signal that depends on the burst rate of the received radio frequency signals.

17. A system as defined in claim 16 wherein said output pulses are rectangular and wherein said measuring means comprises a pulse counter and time-gated means for operating said pulse counter to measure the number of pulses applied to it in a predetermined time interval.

18. The system of claim 17, further including locking means responsive to the generation by said phase lock circuit of said output pulses to enable said measuring means, whereby said measuring means is capable of measuring said burst rate only when a phase lock exists between said output pulses and said pulses developed by said demodulator.

19. The system of claim 18, wherein said measuring means includes a timing counter; clock means for driving said counter; accumulator means; and first gate means controlled by said timing counter for applying said output pulses to said accumulator means over a period of time.

20. The system of claim 19 wherein said measuring means further includes second gate means controlled by said timing counter for applying said output pulses to drive said timing counter to vary said period of time in proportion to said burst rate.

21. The system of claim 20, wherein said measuring means further includes third gate means controlled by said timing counter for applying said output pulses to said timing counter over only a portion of said period of time.

22. The system of claim 21, wherein said measuring means further includes fourth gating means for applying to said accumulator means a fixed number of auxiliary pulses, whereby the total number of output pulses and auxiliary pulses applied to said accumulator means represents said burst rate.

23. In a telemetering system for monitoring the variable physiological conditions of a plurality of living subjects that are spaced apart by a predetermined minimum distance, separate telemetering transmitters mounted on the respective subjects to generate carrier wave signals of about the same radio frequency with the carrier wave signals being emitted in bursts from each transmitter at an audio frequency that corresponds to the value of the physiological condition of the said respective subjects, said carrier wave signals having a length much greater than said minimum distance;

the power of each transmitter being such that the signal-to-noise ratio thereof is less than 1 unit beyond said minimum distance;

a single telemetering receiver for receiving carrier wave signals at the aforesaid radio frequencies simultaneously from a plurality of said transmitters; and means connected to said receiver for selectively generating pulses that correspond to bursts of the strongest of said carrier wave signals, and means responsive to said pulses for measuring said burst rate to indicate the physiological condition of the subject from which said strongest of said carrier wave signals is received.

24. The system of claim 23, wherein said means for selectively generating pulses comprises:

a demodulator having an automatic gain control circuit for producing at its output detected pulses corresponding to the bursts of received radio frequency signals; and a phase lock unit responsive to said detected pulses for producing a stream of pulses at the output thereof at a rate corresponding to the burst rate of said received carrier wave signals, said phase lock unit including an oscillator and means for sweeping the frequency of oscillation from a high value above said burst rate to a low value below said burst rate, and means controlled by said detected pulses for locking the frequency of oscillation to the burst rate of said strongest of said carrier wave signals.

25. The system of claim 24, wherein said means responsive to said pulses for measuring said burst rate comprises:

a timer unit;
an accumulator;
gate means controlled by said timer unit for feeding said stream of pulses to said accumulator for a predetermined period of time;
starter means for initiating operation of said receiver, said accumulator, and said timer unit;
means controlled by said starter means to initiate operation of said receiver unit and to delay the initiation of operation of said timer unit and said accumulator for a period of time sufficient to permit said phase lock unit to be locked with the received bursts of radio-frequency signals at said burst rate.

26. In a system for representing the value of a parameter that is a function of the pulse rate of a stream of input pulses which function is characterized by an intercept A at the 0 pulse rate, said system having input means for receiving such a stream of input pulses and a digital output counter for storing a manifestation of a total-number in digital form, the improvement that comprises:

a timer unit including a clock pulse source, a timer counter, and means for feeding clock pulses from said clock pulse source to said timer counter;

means controlled by said timer unit for gating input pulses during a first timer interval;

auxiliary means for producing an auxiliary digital signal that is at least partially dependent on the value of said intercept A;

means controlled by said gated pulses and by said auxiliary digital signal for storing in said output counter a manifestation of a total-number representing the value of said parameter.

27. In a system as defined in claim 26, a device for displaying numbers in visible form, and
means controlled by received pulses for operating said device to display numbers stored in said output counter only when the total-number stored exceeds a predetermined amount.

28. The system of claim 27, wherein said timer unit includes a clock pulse source, a timer counter for counting clock pulses from said clock pulse source and a decoder adapted to detect when the number of clock pulses counted has reached a value corresponding to the value of said parameter;

starter means for initiating operation of said output counter, said time means, and said auxiliary means; and means controlled jointly by said decoder means and by said auxiliary means for storing in said digital output counter a manifestation of a total-number corresponding to the value of said parameter.

29. In a system for representing the value of a parameter that is a function of the pulse rate of a stream of pulses over a limited range of pulse rates and which function is characterized by an intercept A at 0 pulse rate, the improvement that comprises:

an output counter for storing a total-number in digital form;

auxiliary means for producing a set of digital signals that are at least partially dependent on the value of said intercept;

input means for receiving such a stream of pulses;
a timer unit, including a clock pulse source, and a timer counter;

starter means for initiating operation of said output counter, said timer unit, and said auxiliary means;

means controlled by said starter means for feeding pulses from said clock pulse source to said timer counter whereby a timing operation is initiated;

means controlled by said starter means for feeding input pulses to said output counter; and means controlled by said timer unit when the number of clock pulses fed to the timer counter has reached a count corresponding to a determined time period for discontinuing the feeding of further input pulses to said output counter.

30. In a system for representing the value of a physiological parameter which involves the detection of the value of said parameter and the transmission of radio frequency signals from a transmitter in a stream of bursts at a burst rate that is a function of the detected value of the physiological parameter which function is characterized by an intercept A at 0 pulse rate:

a radio-frequency receiver unit including means for receiving said bursts of radio-frequency signals and for converting the bursts of received signals into a stream of pulses that have a frequency proportional to the burst rate of said radio-frequency signals;

means for producing an auxiliary digital signal representing a number corresponding to said intercept A;

means for gating pulses in said stream during a selected time interval proportional to said burst rate;

an output counter; and means controlled by said auxiliary digital signal and said gated pulses for storing in said output counter a digital manifestation of the sum of said numbers, thereby representing the value of said physiological parameter.

31. A system as defined in claim 30, said receiver unit including a demodulator having an automatic gain control circuit for producing at its output detected pulses corresponding to the bursts of received radio frequency signals;

a phase lock unit responsive to said detected pulses for producing said stream of pulses at the output thereof, said phase lock unit including an oscillator and means for sweeping the frequency of oscillation from a high value above said burst rate to a low value below said burst rate, and means controlled by said detected pulses for locking the frequency of oscillation to the burst rate;

starting means for initiating operation of said receiver unit, said output counter, said means for gating, and said means for producing an auxiliary digital signal; and means controlled by said starting means to delay the initiation of operation of said means for gating and said output counter for a period of time sufficient to permit said phase lock unit to be locked with the received bursts of radio frequency signals at said burst rate.

32. In a system as defined in claim 31, a device for visibly digital numbers in visible form; and means for operating said device to display the total number stored in said output counter only when the total number stored exceeds a predetermined amount.

33. A system for transmitting and receiving signals corresponding to a physiological parameter of a subject, comprising:

a sensing element adapted to detect the value of said physiological parameter;

a transmitter controlled by said sensing element to produce a modulated radio frequency magnetic field, said magnetic field being modulated in accordance with the value of the detected parameter;

a receiver including antenna means for inductively receiving within the extreme-near-field region of said transmitter said modulated radio frequency magnetic field;

electrostatic shield means for said antenna for reducing electrostatic radiation to and from said receiver without substantially reducing the reception of said magnetic field;

phase lock means within said receiver and responsive to the modulation of said magnetic field for detecting the average rate of a repetitive component of said modulation and rejecting noise caused by interfering magnetic fields; and means responsive to said average rate for determining the value of said parameter.

34. The system of claim 33, wherein said means for determining the value of said parameter includes:

means producing output pulses at said average rate;

means accumulating a predetermined number of count pulses during a first time period and a variable number of count pulses during a second time period; and means responsive to said output pulses for varying said second time period in accordance with said average rate to compensate for nonlinearities in the relationship between said modulation and the value of said detected parameter, whereby the value of said parameter may be accurately determined by the total number of count pulses accumulated during said first and second time periods.

35. The system of claim 33, wherein said means for determining the value of said parameter includes counter means responsive to said average rate for producing count pulses at a rate which corresponds to said average rate, and accumulator means receiving and accumulating pulses produced at said average rate for a period of time defined by a predetermined number of said count pulses, said period of time varying in accordance with said average rate to compensate for nonlinearities in the relationship between the modulation of said transmitted magnetic field and the measured value of said parameter, whereby the value of said parameter is accurately determined.

36. The system of claim 33, wherein said transmitter includes antenna means for inductively transmitting said modulated radio frequency magnetic field, and electrostatic shield means for said transmitter antenna to reduce electrostatic radiation to and from said transmitter without substantially reducing the magnetic inductive transmission to the receiver.

37. The system of claim 36, wherein said transmitter antenna includes a tubular core of carbonyl iron and an antenna winding wound on said core, said transmitting antenna electrostatic shield encircling said winding and covering one end of said core.

38. The system of claim 36, wherein said transmitter comprises a blocking oscillator responsive to changes in said sensing element to emit bursts of radio frequency signals at a rate substantially propositional to said measured parameter, said means for determing the value of said parameter compensating for nonlinearities in the change of said burst rate with changes in said measured parameter.

39. A system for transmitting and receiving signals corresponding to a physiological parameter of a subject, comprising:

sensing means responsive to the value of said parameter;

transmitter means controlled by said sensing means for producing a varying magnetic field modulated in accordance with the value of said parameter;

receiver means responsive to said modulated magnetic field;

means connected to said receiver means producing output pulses at a rate corresponding to a repetitive component of said modulated magnetic field;

means accumulating said output pulses over a predetermined period of time; and means for varying said predetermined period of time in accordance with said rate to compensate for nonlinearities in the generation and transmission of said rate.

40. The system of claim 39, wherein said means producing output pulses includes means detecting the average rate of said repetitive component of said modulated magnetic field, whereby interfering magnetic fields are rejected by said receiver, and producing said output pulses at said average rate.

41. The system of claim 40, wherein said means for detecting the average rate of the repetitive component of a received modulated magnetic field comprises a phase lock circuit which locks onto, and thereafter generates output pulses at, a rate corresponding to the modulation of said magnetic field.

42. The system of claim 41, wherein said transmitted magnetic field is burst modulated at a rate which is substantially proportional to the value of said parameter, and wherein said output pulses are generated at a rate corresponding to the average rate of said burst modulation.

* * * * *

UNITED STATES PATENT OFFICE
CERTIFICATE OF CORRECTION

PATENT NO. : 3,872,455
DATED : 18 MARCH 1975
INVENTOR(S) : Charles H. Fuller; Carl E. Herring It is certified that error appears in the above-identified patent and that said Letters Patent are hereby corrected as shown below:

In the Claims

Claim 1, line 14 (column 44, line 19) change "siganls" to --signals--.

Claim 5, line 2 (column 44, line 60) change "scanning" to --summing--.

Claim 32, line 2 (column 49, line 37) change "visibly digital" to --visibly displaying digital--.

Signed and sealed this 20th day of May 1975.

(SEAL)
Attest:

RUTH C. MASON
Attesting Officer

C. MARSHALL DANN
Commissioner of Patents
and Trademarks